United States Patent
Aloisio et al.

(10) Patent No.: US 11,887,505 B1
(45) Date of Patent: Jan. 30, 2024

(54) SYSTEM FOR DEPLOYING AND MONITORING NETWORK-BASED TRAINING EXERCISES

(71) Applicant: Architecture Technology Corporation, Minneapolis, MN (US)

(72) Inventors: Scott Aloisio, Willseyville, NY (US); Robert A. Joyce, Ithaca, NY (US)

(73) Assignee: ARCHITECTURE TECHNOLOGY CORPORATION, Minneapolis, MN (US)

( * ) Notice: Subject to any disclaimer, the term of this patent is extended or adjusted under 35 U.S.C. 154(b) by 652 days.

(21) Appl. No.: 16/393,276

(22) Filed: Apr. 24, 2019

(51) Int. Cl.
*G09B 5/12* (2006.01)
*G06T 19/00* (2011.01)
*G02B 27/01* (2006.01)

(52) U.S. Cl.
CPC ............. *G09B 5/12* (2013.01); *G02B 27/017* (2013.01); *G06T 19/003* (2013.01); *G06T 19/006* (2013.01)

(58) Field of Classification Search
CPC ....... G06T 19/003; G06T 19/006; G09B 5/12; G09B 20/017
See application file for complete search history.

(56) References Cited

U.S. PATENT DOCUMENTS

| | | | |
|---|---|---|---|
| 4,895,518 A | 1/1990 | Arnold et al. | |
| 5,440,723 A | 8/1995 | Arnold et al. | |
| 5,601,432 A | 2/1997 | Bergman | |
| 5,944,783 A | 8/1999 | Nieten | |
| 6,345,283 B1 | 2/2002 | Anderson | |
| 7,058,968 B2 | 6/2006 | Rowland et al. | |
| 7,107,347 B1 | 9/2006 | Cohen | |
| 7,228,566 B2 | 6/2007 | Caceres et al. | |
| 7,234,168 B2 | 6/2007 | Gupta et al. | |
| 7,325,252 B2 | 1/2008 | Bunker et al. | |

(Continued)

FOREIGN PATENT DOCUMENTS

WO     02071192 A2     9/2002

OTHER PUBLICATIONS

Advisory Action from U.S. Appl. No. 15/712,057, dated Apr. 10, 2020, 3 pp.

(Continued)

*Primary Examiner* — Justin S Lee
(74) *Attorney, Agent, or Firm* — Shumaker & Sieffert, P.A.

(57) ABSTRACT

Techniques are described for implementing a system that deploys and monitors training simulations and exercises across a network, and that enables the development and execution of virtual training. An example system outputs, for display in a web browser of a trainee computing system, a graphical user interface that includes one or more training exercises, and initiates execution of software agent(s) associated with skill(s) to be demonstrated by a trainee. The example system outputs, at the trainee computing system, content corresponding to scene(s) of an at least partially virtual environment for a training exercise, where the content is rendered for display at least in the web browser of the trainee computing system. After receiving interaction data collected by the software agent(s) during the training exercise, the example system determines, based on the interaction data, that the skill(s) associated with the training exercise have been demonstrated.

19 Claims, 11 Drawing Sheets

(56) References Cited

U.S. PATENT DOCUMENTS

| | | |
|---|---|---|
| 7,372,809 B2 | 5/2008 | Chen et al. |
| 7,496,959 B2 | 2/2009 | Adelstein et al. |
| 7,522,908 B2 | 4/2009 | Hrastar |
| 7,694,328 B2 | 4/2010 | Joshi et al. |
| 7,748,040 B2 | 6/2010 | Adelstein et al. |
| 7,818,804 B2 | 10/2010 | Marceau |
| 7,886,049 B2 | 2/2011 | Adelstein et al. |
| 7,925,984 B1 | 4/2011 | Awe et al. |
| 7,930,353 B2 | 4/2011 | Chickering et al. |
| 8,079,080 B2 | 12/2011 | Borders |
| 8,176,557 B2 | 5/2012 | Adelstein et al. |
| 8,250,654 B1 | 8/2012 | Kennedy et al. |
| 8,266,320 B1 | 9/2012 | Bell et al. |
| 8,307,444 B1 | 11/2012 | Mayer et al. |
| 8,321,437 B2 | 11/2012 | Lim |
| 8,341,732 B2 | 12/2012 | Croft et al. |
| 8,406,682 B2 | 3/2013 | Elesseily et al. |
| 8,407,801 B2 | 3/2013 | Ikegami et al. |
| 8,433,768 B1 | 4/2013 | Bush et al. |
| 8,490,193 B2 | 7/2013 | Sarraute Yamada et al. |
| 8,495,229 B2 | 7/2013 | Kim |
| 8,554,536 B2 | 10/2013 | Adelman et al. |
| 9,076,342 B2 | 7/2015 | Brueckner et al. |
| 9,384,677 B2 | 7/2016 | Brueckner et al. |
| 10,026,509 B2 | 7/2018 | Powers et al. |
| 10,057,298 B2 | 8/2018 | Bronner et al. |
| 10,067,787 B2 | 9/2018 | Bronner et al. |
| 10,068,493 B2 | 9/2018 | Brueckner et al. |
| 10,685,488 B1 * | 6/2020 | Kumar .................. A61H 23/04 |
| 2002/0073204 A1 | 6/2002 | Dutta et al. |
| 2002/0078382 A1 | 6/2002 | Sheikh et al. |
| 2002/0129264 A1 | 9/2002 | Rowland et al. |
| 2002/0162017 A1 | 10/2002 | Sorkin et al. |
| 2003/0056116 A1 | 3/2003 | Bunker et al. |
| 2003/0182582 A1 | 9/2003 | Park et al. |
| 2003/0236993 A1 | 12/2003 | McCreight et al. |
| 2004/0039921 A1 | 2/2004 | Chuang |
| 2005/0132225 A1 | 6/2005 | Gearhart |
| 2005/0165834 A1 | 7/2005 | Nadeau et al. |
| 2005/0193173 A1 | 9/2005 | Ring et al. |
| 2005/0193430 A1 | 9/2005 | Cohen et al. |
| 2005/0203921 A1 | 9/2005 | Newman et al. |
| 2006/0037076 A1 | 2/2006 | Roy |
| 2006/0104288 A1 | 5/2006 | Yim et al. |
| 2006/0109793 A1 | 5/2006 | Kim et al. |
| 2006/0167855 A1 | 7/2006 | Ishikawa et al. |
| 2006/0248525 A1 | 11/2006 | Hopkins |
| 2006/0253906 A1 | 11/2006 | Rubin et al. |
| 2007/0055766 A1 | 3/2007 | Petropoulakis et al. |
| 2007/0112714 A1 | 5/2007 | Fairweather |
| 2007/0192863 A1 | 8/2007 | Kapoor et al. |
| 2008/0010225 A1 | 1/2008 | Gonsalves et al. |
| 2008/0167920 A1 | 7/2008 | Schmidt et al. |
| 2008/0183520 A1 | 7/2008 | Cutts et al. |
| 2008/0222734 A1 | 9/2008 | Redlich et al. |
| 2009/0007270 A1 | 1/2009 | Futoransky et al. |
| 2009/0144827 A1 | 6/2009 | Peinado et al. |
| 2009/0150998 A1 | 6/2009 | Adelstein et al. |
| 2009/0158430 A1 | 6/2009 | Borders |
| 2009/0164522 A1 | 6/2009 | Fahey |
| 2009/0208910 A1 | 8/2009 | Brueckner et al. |
| 2009/0254572 A1 | 10/2009 | Redlich et al. |
| 2009/0288164 A1 | 11/2009 | Adelstein et al. |
| 2009/0298028 A1 * | 12/2009 | Saunders ............. G09B 19/003 434/258 |
| 2009/0319247 A1 | 12/2009 | Ratcliffe, III et al. |
| 2009/0319249 A1 | 12/2009 | White et al. |
| 2009/0319647 A1 | 12/2009 | White et al. |
| 2009/0319906 A1 | 12/2009 | White et al. |
| 2009/0320137 A1 | 12/2009 | White et al. |
| 2009/0328033 A1 | 12/2009 | Kohavi et al. |
| 2010/0010968 A1 | 1/2010 | Redlich et al. |
| 2010/0058114 A1 | 3/2010 | Perkins et al. |
| 2010/0146615 A1 | 6/2010 | Locasto et al. |
| 2010/0319069 A1 | 12/2010 | Granstedt et al. |
| 2011/0008758 A1 * | 1/2011 | Kortas .................. G09B 7/02 434/219 |
| 2011/0154471 A1 | 6/2011 | Anderson et al. |
| 2011/0167103 A1 * | 7/2011 | Acosta .................. G09B 5/10 709/203 |
| 2011/0177480 A1 | 7/2011 | Menon et al. |
| 2011/0269111 A1 * | 11/2011 | Elesseily ............... G06Q 10/10 434/362 |
| 2012/0122062 A1 * | 5/2012 | Yang .................. G09B 19/003 434/219 |
| 2012/0210427 A1 | 8/2012 | Bronner et al. |
| 2013/0189658 A1 * | 7/2013 | Peters .................. G06F 30/20 434/234 |
| 2013/0347085 A1 | 12/2013 | Hawthorn et al. |
| 2013/0347116 A1 | 12/2013 | Flores et al. |
| 2014/0099622 A1 | 4/2014 | Arnold et al. |
| 2014/0287383 A1 | 9/2014 | Willingham et al. |
| 2017/0003269 A1 | 2/2017 | Brueckner et al. |
| 2017/0032694 A1 | 2/2017 | Brueckner et al. |
| 2017/0032695 A1 | 2/2017 | Brueckner et al. |
| 2017/0289186 A1 * | 10/2017 | Staniford ............ H04L 63/1425 |
| 2018/0130376 A1 * | 5/2018 | Meess .................. G06T 7/70 |
| 2018/0268738 A1 * | 9/2018 | Miller .................. G06F 3/011 |
| 2018/0342103 A1 * | 11/2018 | Schwarz ............ G06F 3/04845 |
| 2019/0130788 A1 * | 5/2019 | Seaton .................. G02B 27/017 |
| 2019/0139307 A1 * | 5/2019 | Min .................. G06F 3/011 |
| 2019/0304188 A1 * | 10/2019 | Bridgeman ............. G09B 5/02 |
| 2019/0325774 A1 * | 10/2019 | McLeod ................ G09B 19/24 |

OTHER PUBLICATIONS

Notice of Allowance from U.S. Appl. No. 15/712,057, dated Jun. 15, 2020, 5 pp.

Office Action from U.S. Appl. No. 15/712,057, dated Sep. 11, 2019, 12 pp.

Response to Office Action dated Sep. 11, 2019, from U.S. Appl. No. 15/712,057, filed Dec. 10, 2019, 11 pp.

Notice of Allowance from U.S. Appl. No. 16/137,735, dated Sep. 17, 2020, 7 pp.

Air Force SBIR/STIR Award Details, "CYDEST: CYber DEfense Simulation Trainer," Phase I, Award Details Status: Completed (Invited for Phase II) Start: Apr. 13, 2005 End Jan. 13, 2005, retrieved on June 16, 2015 from http:// www.afsbirsttr.com/award/AWARDDetails.aspx?pk=12036, 2 pp.

Architecture Technology Corporation et ai.,"Cydest (Cyber Defense Simulation Trainer),"http://web.archive.org/web/20061107010247/www.atcorp.com/securesystems/cydesl.hlml, Dec. 2005, 1 pp.

ATC-NY et ai.,"Cyber Defense Simulation Trainer (CYDEST)," CYDEST Congressional Briefing, Feb. 19, 2007, 1 pp.

Bergstrom et al., "The Distributed Open Network Emulator: Using Relativistic Time for Distributed Scalable Simulation," Proceedings of the 20th Workshop on Principles of Advanced and Distributed Simulation, May 23-26 2006, 7 pp.

Brueckner et al., "CYDEST Cyber Defense Simulation Trainer," ATC-NY a subsidiary of Architecture Technology Corporation, Oct. 29, 2007, 20 pp.

C.M.U. Entertainment Technology Center, "CyberSecurity," found at http://www.etc.cmu.edu/projects/cybersecurity/, Feb. 2000, 17 pp.

Carson et al., "NIST NET: A Linux-based network emulation tool" ACM SIGCOMM, Computer Communication Review, vol. 33, Issue 3, Jul. 2003, 16 pp.

Carver et al., "Military Academy Attack/Defense Network" IEEE Systems, Man, and Cybernetics Information Assurance and Security Workshop, West Point, NY, Jun. 17-19, 2002, 6 pp.

Cohen, "Simulating Cyber Attacks, Defenses, and Consequences," Fred Cohen & Associates, retrieved from http://all.net/journal/ntb/simulate/simulate.html, Mar. 1999, 36 pp.

Crumb, "Hackfest! Highlights Cyber Security Boot Camp," Air Force Research Laboratory (AFRL) Information Directorate document, Oct./Nov. 2004, 1pp.

Davoli, "Virtual Square," Proceedings of the First International Conference on Open Source Systems, Genova, Jul. 11-15, 2005, 6 pp.

(56) References Cited

OTHER PUBLICATIONS

Davoli, "Virtual Square: all the virtuality you always wanted but you were afraid to ask," http://virtualsguare.org/copyright Renzo Davoli, May 27, 2004, 1 pp.

DeLooze et al., "Incorporating Simulation into the Computer Security Classroom," 3ath ASEE/IEEE Frontiers in Education Conference S1F-13, Oct. 2004, 6 pp.

Duggirala et al., "Open Network Emulator," found at hllp:l/csrl.cs. vl.edu/net_emulation.html, Jan. 15, 2005, 5 pp.

EADS NA Defense Security & Systems Solutions Inc., "How can Cybersecurity Network TRaining Simulator (CYNTERS) benefit Department of Defense, Federal and Commercial agencies' information assurance programs?," Feb. 20, 2008, 4 pp.

Honeynet Project, "Know Your Enemy: Defining Virtual Honeynets," hllp:l/old.honeynel.org/papers.virtual/, Jan. 27, 2003, 5 pp.

Howard et al., "A Common Language for Computer Security Incidents," Sandia National Laboratories Report, SAND98 8667, Oct. 1998, 32 pp.

Keshav, "Real: A Network Simulator," Computer Science Division, Department of Electrical Engineering and Computer Science, University of Berkeley, Dec. 1988, 10 pp.

Killcrece et al., "State of the Practice of Computer Security Incident Response Teams (CSIRTs)," Carnegie Mellon Software Engineering Institute Technical Report CMU/SEI-2003-TR-001 ESC-TR-2003-001, Oct. 2003, 293 pp.

Krishna et al., "V-NetLab: A Cost-Effective Plalfonn to Support Course Projects in Computer Security", Department of Computer Science, Stony Brook University, Jun. 2005, 7 pp.

Lathrop et al., "Information Warfare in the Trenches: Experiences from the Firing Range," U.S. Military Academy, Security education and critical infrastructures, Kluwer Academic Publishers Norwell, MA, USA © Jun. 23-26, 2003, 23 pp.

Lathrop et al., "Modeling Network Attacks in MAADNET, 12th Conference on Behavior Representation in Modeling and Simulation," May 12-15, 2003,16 pp.

Liljenstam et al., "RINSE: The Real-Time Immersive Network Simulation Environment for Network Security Exercises," Proceedings of the 19th Workshop on Principles of Advanced and Distributed Simulation (PADS), Jun. 2005, 10 pp.

McDonald, "A Network Specification Language and Execution Environment for Undergraduate Teaching", A.M SIGCSE Bulletin, vol. 23, Issue 1, Mar. 1991, 11 pp.

McGrath et al., "NetSim: A Distributed Network Simulation to Support Cyber Exercises," Institute for Security Technology Studies, Dartmouth College, Huntsville Simulation Conference, Mar. 9-11, 2004, Huntsville, Alabama, 6 pp.

Padman et al., "Design of a Virtual Laboratory for Information Assurance Education and Research," Proceedings of the 2002 IEEE, Workshop on Information Assurance and Security, U.S. Military Academy, West Point, Jun. 2002, 7 pp.

Pratt, "The Xen™ virtual machine monitor," University of Cambridge Computer Laboratory Systems Research Group NetOS, retrieved from https://www.cl.cam.ac.uk/research/srg/netos/projects/archive/xen/, Feb. 25, 2008, 2 pp.

Prosecution History from U.S. Appl. No. 14/811,403, dated Jul. 28, 2015 through May 22, 2018, 137 pp.

Prosecution History from U.S. Appl. No. 15/712,057, dated Sep. 21, 2017 through Jul. 17, 2019, 67 pp.

Saic et al., "TeamDefend, A White Paper on Strengthening the Weakest Link: Organizational Cyber Defense Training," 17th Annual FIRST Conference, June 26-Jul. 1, 2005, 6 pp.

Saunders, "Simulation Approaches in Information Security Education," Proceedings of the Sixth National Colloquium for Information Systems Security Education, Redmond, Washington, Jun. 4-6, 2002, 14 pp.

Schafer et al., "The IWAR Range: A Laboratory for Undergraduate Information Assurance Education," Military Academy West Point, NY, Research paper, found at http:l/handle.dtic.mil/1 00.2/ADA408301, Nov. 7, 2000, 7 pp.

Schepens et al., "The Cyber Defense Exercise: An evaluation of the Effectiveness of Information Assurance Education," 2003 (Applicant points out, in accordance with MPEP 609.04(a), that the year of publication, 2003, is sufficiently earlier than the effective U.S. filing date, 2017, so that the particular month of publication is not in issue.) 14 pp.

Stumpf et al., "NoSE-building virtual honeynets made easy," Darmstadt University of Technology, Department of Computer Science, D-64289 Darmstadt, Germany, Jan. 2005, 11 pp.

Stytz et al., "Realistic and Affordable Cyberware Opponents for the Information Warfare BattleSpace," Jun. 2003, 43 pp.

U.S. Appl. No. 15/712,057, filed Sep. 21, 2017, by Donovan et al.

U.S. Appl. No. 16/137,735, filed Sep. 21, 2018, by Brueckner et al.

U.S. Appl. No. 14/811,403, filed by Stephen K. Brueckner filed Jul. 28, 2015.

Varga, "The OMNeT ++ Discrete Event Simulation System," Department of Telecommunications, Budapest University of Technology and Economics, Proceedings of the European Simulation Multiconference, Jun. 2001, 8 pp.

Vrable et al., "Scalability, Fidelity, and Containment in the Potemkin Virtual Honeyfarm," SOSP, Oct. 23-26, 2005, 15 pp.

Wang et al., "The Design and Implementation of the NCTUns 1.0 Network Simulator," Computer Networks, vol. 42, Issue 2, Jun. 2003, 23 pp.

White et al.,"Cyber Security Exercises: Testing an Organization's Ability to Prevent, Detect and Respond to Cyber Security Events," Proceeding of the 37th Hawaii International Conference on System Sciences, Jan. 2004, 10 pp.

Zeng et al., "GloMoSim: A library for Parallel Simulation of Large-scale Wireless Networks" ACM SIGSIM Simulation Digest, vol. 28, Issue 1, Jul. 1998, 9 pp.

U.S. Appl. No. 16/015,116, filed Jun. 21, 2018, by Tyler J. Mitchell et al.

U.S. Appl. No. 16/432,457, filed Jun. 5, 2019, by Tyler J. Mitchell et al.

Office Action from U.S. Appl. No. 15/712,057, dated Feb. 3, 2020, 13 pp.

Response to the Office Action dated Feb. 3, 2020, from U.S. Appl. No. 15/712,057, filed Mar. 30, 2020, 12 pp.

\* cited by examiner

SELECTABLE TRAINING EXERCISES — 70

TRAINING EXERCISE 1 (E.G., FLIGHT SIMULATOR)

∎
∎
∎

TRAINING EXERCISE N (E.G., POWER GRID TRAINING)

FIG. 4A

| | | CYRIN AGENT PLUGINS | | 80 |
|---|---|---|---|---|
| ID | DATE ADDED | NAME | DESCRIPTION | UPLOADER |
| 1 | 02/13/2015 | FILE SYSTEM MONITOR | REPORTS CHANGES TO FILES... | ADMIN |
| 2 | 02/13/2015 | LOGIN_TEST | ATTEMPTS TO LOG A USER IN | ADMIN |
| 3 | 02/13/2015 | EMAIL_SENDER | SENDS AN EMAIL VIA THE... | ADMIN |
| 4 | 02/13/2015 | NETWORK CONNECTION LIST | LISTS CURRENT NETWORK CO... | ADMIN |
| 5 | 02/13/2015 | NETWORK CONNECTION MO... | REPORTS START/STOP OF NE... | ADMIN |
| 6 | 02/13/2015 | PROCESS LIST | LISTS CURRENT RUNNING PR... | ADMIN |
| 7 | 02/13/2015 | PROCESS MONITOR | REPORTS START/STOP OF PR... | ADMIN |
| 8 | 02/13/2015 | PROGRAM LIST | CREATES A LIST OF ALL PROG... | ADMIN |
| 9 | 02/13/2015 | REGISTRY MONITOR | REPORTS CHANGES TO SPEC... | ADMIN |
| 10 | 02/13/2015 | REMOTE PORT MONITOR | CHECK FOR CONNECTION TO... | ADMIN |
| 11 | 02/13/2015 | SESSION MONITOR | REPORTS CHANGES TO USER... | ADMIN |
| 12 | 02/13/2015 | WEBPAGE SEARCH | REPORTS IF A WORD IS LOCA... | ADMIN |

SERVER RESPONSE 0.126 SEC — 1-12 OF 12 (BUFFERED 12)

FIG. 5

AGENT:
FILE SYSTEM MONITOR (1)

POINTS:
(2)

AGENT OPTIONS:
DIRECTORY:
FILE NAME FILTER: (3)

EVALUATION CRITERIA:
| | | |
|---|---|---|
| PATH | CONTAINS | |
| STATUS | CONTAINS | |
| RENAMED_TO | CONTAINS | |
| CHANGE_TYPE | CONTAINS | |

(4)

APPLY TO NODE: WEBSERVER (5)

SAVE    CANCEL

FIG. 6

SYSTEM FOR DEPLOYING AND MONITORING NETWORK-BASED TRAINING EXERCISES

STATEMENT REGARDING FEDERALLY SPONSORED RESEARCH OR DEVELOPMENT

This invention was made with government support under Contract No. FA3002-19-P-A090 awarded by the United States Air Force. The government has certain rights in this invention.

TECHNICAL FIELD

This disclosure relates to training systems and, more particularly, to computing systems that provide network-based training systems and simulation.

BACKGROUND

One of the more effective methods of skill acquisition is problem-based learning. In the case of cyber operations, problem-based learning may be achieved by providing realistic, hands-on cyber exercises to trainees. The military, commercial enterprises, and academic institutions all conduct cyber exercises to educate and train personnel. Exercises are conducted in both individual and group formats, and team exercises may be conducted cooperatively or as competitions.

Computer-based training may be one of the more effective teaching methods available today, as evidenced, for example, by the military's dedication to training exercises in preparation for battle (e.g., flight simulators). Computer-based training exercises may cover a wide array of training topics, and trainees may have the flexibility of performing training exercises using either local or remote computer connections. Trainees may even utilize one or more computing devices to obtain online training via one or more networks, such as the Internet.

SUMMARY

The present disclosure describes techniques for implementing a system that deploys and monitors training simulations and exercises across a network, and that enables the development and execution of virtual training courses. Virtual reality (VR) based simulations and training exercises enable highly effective, compelling training mechanisms that are more accessible to trainees and more efficient for instructors to manage. The disclosed techniques have the potential to improve many types and aspects of training, particularly operational training, by reducing costs and improving trainee throughput and effectiveness. These techniques provide a learning management system for virtual training courses that are deployed and executed in a web browser, and which may in some cases leverage three-dimensional (3D) web rendering technology in conjunction with a training platform to utilize agents that are deployed on an exercise network to collect exercise data and objectively monitor cyber training events.

In one example, a method includes outputting, by a server and for display in a web browser of a trainee computing system, a graphical user interface that includes a list of one or more training exercises, wherein each of the one or more training exercises is associated with one or more skills to be demonstrated by a trainee using the trainee computing system during the respective training exercise, responsive to receiving a request from the trainee computing system to start a training exercise included in the list, initiating, by the server, execution of one or more software agents that are associated with the one or more skills to be demonstrated by the trainee during the training exercise, and outputting, by the server and to the trainee computing system, content corresponding to one or more scenes of an at least partially virtual environment for the training exercise, wherein the content is rendered for display at least in the web browser of the trainee computing system. The example method further includes receiving, by the server and from the trainee computing system during the training exercise, interaction data collected by the one or more software agents, wherein the interaction data is associated with at least one interaction by the trainee with the content corresponding to the one or more scenes, and determining, by the server and based on the interaction data, that the one or more skills associated with the training exercise have been demonstrated by the trainee.

In one example, a computer-readable storage medium comprising instructions that, when executed, cause one or more processors of a server to perform operations including: outputting, for display in a web browser of a trainee computing system, a graphical user interface that includes a list of one or more training exercises, wherein each of the one or more training exercises is associated with one or more skills to be demonstrated by a trainee using the trainee computing system during the respective training exercise; responsive to receiving a request from the trainee computing system to start a training exercise included in the list, initiating execution of one or more software agents that are associated with the one or more skills to be demonstrated by the trainee during the training exercise; outputting, to the trainee computing system, content corresponding to one or more scenes of an at least partially virtual environment for the training exercise, wherein the content is rendered for display at least in the web browser of the trainee computing system; receiving, from the trainee computing system during the training exercise, interaction data collected by the one or more software agents, wherein the interaction data is associated with at least one interaction by the trainee with the content corresponding to the one or more scenes; and determining, based on the interaction data, that the one or more skills associated with the training exercise have been demonstrated by the trainee.

In one example, a system includes one or more processors and a computer-readable storage medium. The computer-readable storage medium stores instructions that, when executed, cause the one or more processors to: output, for display in a web browser of a trainee computing system, a graphical user interface that includes a list of one or more training exercises, wherein each of the one or more training exercises is associated with one or more skills to be demonstrated by a trainee using the trainee computing system during the respective training exercise; responsive to receiving a request from the trainee computing system to start a training exercise included in the list, initiate execution of one or more software agents that are associated with the one or more skills to be demonstrated by the trainee during the training exercise; output, at the trainee computing system, content corresponding to one or more scenes of an at least partially virtual environment for the training exercise, wherein the content is rendered for display at least in the web browser of the trainee computing system; receive, from the trainee computing system during the training exercise, interaction data collected by the one or more software agents, wherein the interaction data is associated with at least one interaction by the trainee with the content corresponding to the one or more scenes; and determine, based on the interaction data, that the one or more skills associated with the training exercise have been demonstrated by the trainee.

The details of one or more examples are set forth in the accompanying drawings and the description below. Other features, objects, and advantages of the disclosure will be apparent from the description and drawings, and from the claims.

BRIEF DESCRIPTION OF DRAWINGS

FIG. 4A is a screen diagram illustrating an example graphical window that includes multiple selectable training exercises, in accordance with one or more aspects of the present disclosure.

FIG. 5 is a screen diagram illustrating an example graphical window displaying a list of agents and/or plugins for agents, in accordance with one or more aspects of the present disclosure.

FIG. 6 is a screen diagram illustrating an example graphical window of an agent configuration form, in accordance with one or more aspects of the present disclosure.

DETAILED DESCRIPTION

Figure 1:
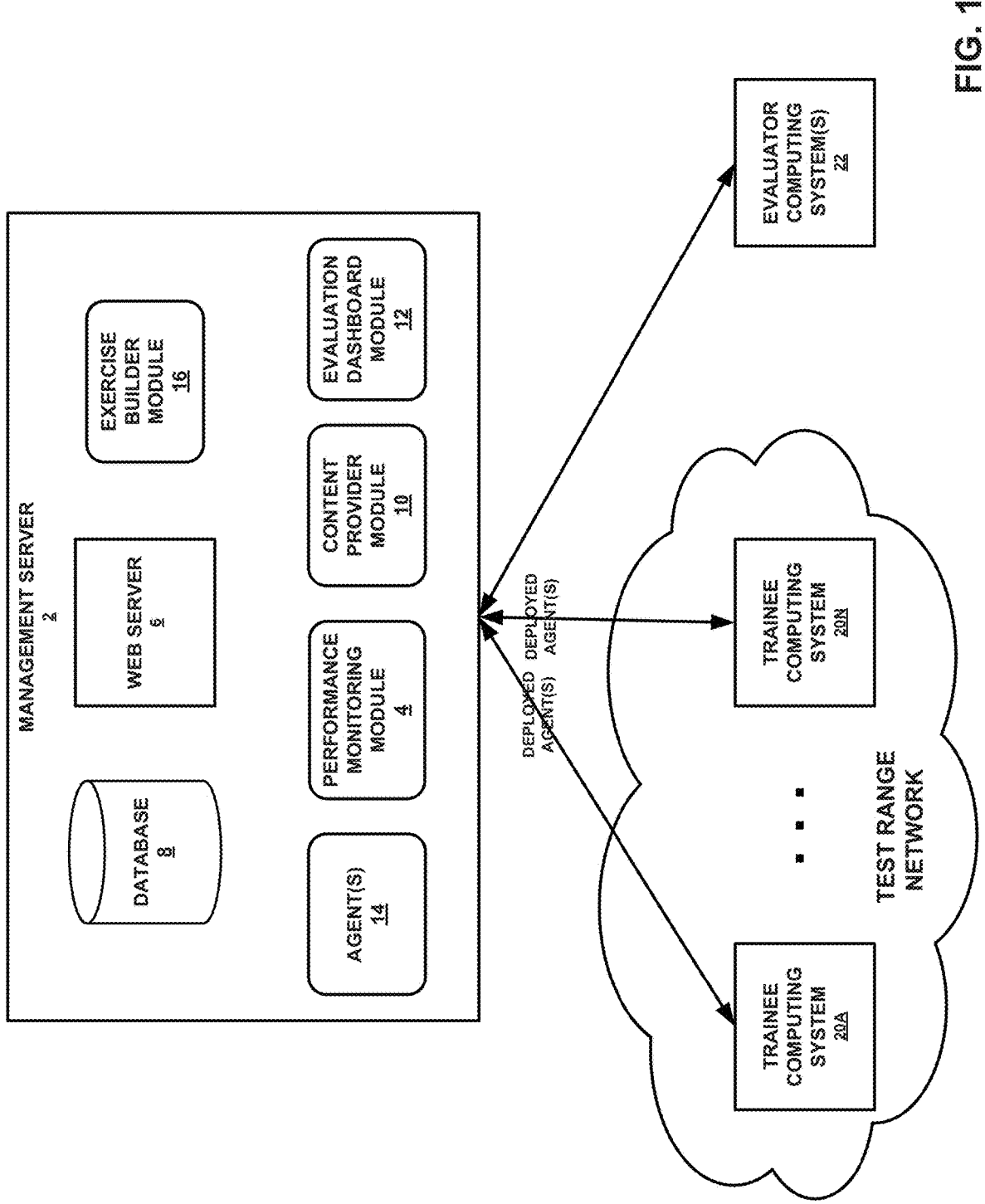
FIG. 1 is a block diagram illustrating an example training environment system that includes one or more trainee computing systems, one or more evaluator computing systems, and a management server, in accordance with one or more aspects of the present disclosure.

Training through computer-based exercises and simulation is effective at teaching a wide variety of skills (e.g., flight training). Many institutions, both military and enterprise, use computer-based exercises to provide training. Effective trainee monitoring and assessment is important to successful training, yet over-the-shoulder monitoring can be labor intensive, costly and inaccurate, because it requires a ratio of almost one instructor to one trainee, and even with a one-to-one ratio, there may be issues caused by human error. Mistakes caused by inadequate training can lead to broken equipment, costly repairs, or other issues.

Traditional, experience-based training and simulator scenarios are often inconvenient for trainees. Due to the complexity of hardware integration, simulators can be difficult to acquire and maintain, leading many trainees to share time among few resources. Purpose-built simulators also lack the expressiveness often needed to train key skills. Instructors are also limited by access to training resources. Monitoring of simulator use is often done on site and in person. These limitations lead to high staff-to-trainee ratios and a lack of free practice time. Managing large pools of trainees can be difficult, leading to possible misuse of equipment or safety concerns in the field.

As a result, there is an opportunity for more effective, efficient, inexpensive, and rapid training. The use of more flexible simulator form-factors, such as head-mounted displays, allows for more general exercises to be developed without investing in expensive resources. In addition, remote evaluations may enable more careful and considered approaches to mentorship, where instructors can more easily identify outlier trainees that may require special attention. Similarly, comparing the performance of all trainees enables instructors to focus on subjects that are more universally challenging.

The present disclosure describes techniques for implementing a software system that deploys and monitors training simulations and exercises, and that enables the development and execution of virtual training courses. Virtual reality (VR) based simulation training enables highly effective and compelling training scenarios that are more accessible to trainees and more efficient for instructors to manage. The disclosed techniques have the potential to improve many types and aspects of training, particularly operational training, by reducing costs and improving trainee throughput and effectiveness. The techniques provide a system for virtual training courses that are deployed and executed in a web browser, and which may leverage three dimensional (3D) web rendering technology in conjunction with a training platform to utilize agents that are configured to collect exercise data and objectively monitor cyber training events. The disclosed techniques also provide interactive dashboards that assist in planning and monitoring exercises, as well as in analyzing results. Such capabilities may improve training procedures and enable rapid and efficient development of new training scenarios and visual learning environments.

The disclosed techniques may thus enable the building and deployment of highly accessible training scenarios in which trainees are able to hone their skills without necessarily having to schedule their training sessions with instructors or large pools of other trainees. Improved accessibility may be brought about through inexpensive simulation hardware, remote exercises, and through the maintenance of monitoring and evaluation data for instructors. Trainees are able to utilize a web browser on a computing device, start simulations or exercises, utilize head-mounted displays in certain cases. Progress may be monitored by instructors remotely and stored for future evaluation across all devices.

FIG. 1 is a block diagram illustrating an example environment that includes one or more trainee computing systems 20A-20N (collectively, "trainee computing systems 20"), one or more evaluator computing systems 22, and a management server 2, according to one or more aspects of the present disclosure. In various examples, management server 2 may comprise a system including one or more processors. Trainee computing systems 20 may comprise a heterogeneous training exercise network of computing systems, or test range network, which are communicatively coupled to management server 2 via one or more networks, such as one or more wired and/or wireless networks. Trainee computing systems 20 and evaluator computing systems 22 may each comprise one or more servers, domain controllers, workstations, or other computing devices that are used by individual trainees. Examples of such computing devices may include, but are not limited to, a mobile phone, a tablet computer, a personal digital assistant (PDA), a laptop computer, a portable media player, a wearable computing device (e.g., a watch, a wrist-mounted computing device, a head-mounted computing device), a television platform, or other type of computing device.

As shown in FIG. 1, management server 2 includes a performance monitoring module 4, a web server 6, a database 8, a content provider module 10, an evaluation dashboard module 12, one or more agents 14, and an exercise builder module 16. Modules 12 and 16 are capable of outputting, for display, one or more dashboards, such as a planning dashboard, a builder dashboard, and/or an evaluation dashboard, as will be described in more detail below. If the test range network includes one or more firewalls, one or more firewall rules may be set up to redirect traffic from a given firewall to appropriate ones of trainee computing systems 20.

One or more evaluators or instructors may use evaluator computing systems 22, which are communicatively coupled to management server 2 (e.g., via one or more wired and/or wireless networks). Prior to an exercise, these individuals may use evaluator computing systems 22 to interact with dashboards provided by exercise builder module 16 to capture an existing test range network of computing systems, design a new range network, build or create one or more training exercises, and/or create a monitoring and scoring plan for these exercises. These individuals may also use evaluator computing systems 22 to interact with dashboards provided by evaluation dashboard module 12 to assess and evaluate the performance of trainees based upon actions taken during training exercises. The dashboards provided by modules 12 and 16 include dynamic, web accessible planning and briefing documents to orient both evaluators and trainees on the exercises and expectations. These dashboards may also be used to configure a set of one or more modular agents 14 and objective metrics for use during the exercises. Communication between the agents and management server 2 may be encrypted, such as via the Secure Sockets Layer (SSL) protocol.

While a training exercise is conducted, performance monitoring module 4 deploys agents 14 onto one or more of trainee computing systems 20 of the test range network and receives exercise or interaction data back from trainee computing systems 20. Agents 14 monitor trainee performance while the dashboards assist the evaluator using evaluator computing system 22 monitor the exercise. The evaluators may use the evaluation dashboard that is output by evaluation dashboard module 12 to visualize the exercise data provided by agents 14 during the training session, such as team or individual scores. The exercise data is stored in database 8 of the management server 2. Evaluation dashboard module 12 provides analysis tools, including playback capabilities, and produces a set of dynamic documents to assist the evaluators. Modules 12 and 16 may be implemented as web applications that interface with backend data stored in database 8 and that may, in some cases, be deployed onto evaluator computing system 22. Evaluators therefore may access such data in many ways using evaluator computing system 22 and/or management server 2, including wirelessly via mobile devices or remotely via the Internet. Additional details regarding the use of agents and dashboards may be found in the following U.S. patents and/or U.S. patent applications, which are each incorporated by reference in their entireties: (1) U.S. Pat. No. 10,083,624, issued on Sep. 25, 2018 and entitled "REAL-TIME MONITORING OF NETWORK-BASED TRAINING EXERCISES"; (2) U.S. application Ser. No. 15/712,057, filed on Sep. 21, 2017 and entitled "MODULAR TRAINING OF NETWORK-BASED TRAINING EXERCISES"; and (3) U.S. application Ser. No. 16/137,735, filed on Sep. 21, 2018 and entitled "REAL-TIME MONITORING OF NETWORK-BASED TRAINING EXERCISES".

Agents 14 deployed by management server 2 do not necessarily require any pre-installed infrastructure on trainee computing systems 20, which reduces the effort used to deploy agents 14 and accommodates dynamic changes to exercise networks. Agents 14 may emphasize the forensic principle of non-interference by minimizing their footprint within an exercise, both temporally and spatially, which may add to the realism of an exercise. Agents 14 can be ephemeral, such that they do not necessarily have to stay resident on trainee computing systems 20 over extended amounts of time, which can reduce the chance that trainees will be able to "game the system" by observing or altering agents 14.

Agents 14 can be launched on demand or run throughout the exercise, so management server 2 can use either a pull model or a push model for data acquisition from the agents. The pull model is, in some cases, more flexible and has a lighter footprint, but the push model may, in certain cases, have better performance. Agents 14 can operate on physical hosts over the exercise's test range network, or can operate on virtual machines directly through the hypervisor, without leaving any traces on the network. Many cyber test ranges include virtual machines, and trainee computing systems 20 may comprise one or more virtual machines. In some examples, agents 14 use a three-layer modular design that includes a number of pre-built plugins for hypervisors, operating systems, and performance metrics. This provides the flexibility to support a wide variety of platforms and missions.

Trainee computing systems 20 and/or management server 2 illustrated in FIG. 1 may execute one or more operating systems (e.g., Windows or Linux). These computing systems 20 may execute natively compiled ones of agents 14 that dynamically load natively compiled plugins. These plugins measure specific types of metrics during an exercise. Along with the plugins, parameters are passed to the agents that specify the behavior of the plugin, including what data it collects and how long it should run. For example, an agent may be compiled to run, load a plugin designed to inspect a configuration or interaction data, load parameters that specify that the plugin return a list of interaction data and/or threshold information to management server 2, and then terminate. This list is used to inform assessment functionality.

As a non-limiting example, one of agents 14 may comprise a file watcher agent that stays resident on a target trainee computing system of systems 20 and alerts management server 2 as to changes in files. Its parameters include a list of files and/or directories to watch and how long to continue watching. It will notify management server 2 when a file changes and indicate the nature of the change (e.g., file was created, renamed, written to, read, deleted). As another example, one of agents 14 may comprise a session monitor agent that returns a list of user login/logout events. This agent can be parameterized to return this list and terminate, or to stay resident and notify management server 2 of any further logins/logouts as they occur.

Agents 14 may be configured for execution on one or more different types of architectures or operating systems, such as, for example, the Windows and/or Linux platforms. In general, the test range network comprising trainee computing systems 20 may be a heterogeneous network that supports multiple different types of hardware architectures and operating systems. Agents 14 may also include one or more hypervisor agents, which are agents that do not deploy directly onto trainee computing systems 20 in the test range network, but instead onto virtual machine platforms that host trainee computing systems 20. Hypervisor agents may not leave any footprint (e.g., packets, network connections) on the exercise network for trainees to see.

During training exercises that are performed using management server 2, trainee computing systems 20, and computing system 22, trainees can be evaluated according to whether they accomplish high-level learning objectives. These trainees are able to meet each objective by demonstrating one or more skills during a cyber exercise. Demonstration of a skill can be measured with a set of metrics, which are calculated from observables/parameter data. In certain examples, there are two types of observables in a cyber exercise: measurements (e.g., determination of system state at a point in time), and events (e.g., changes to system state at a point in time). Agents 14 are configured to gather observables from trainee computing systems 20 in the test range network, and these observables are used by management server to provide one or more metrics on interaction data that is displayed by evaluation dashboard module 12, as will be described in further detail below. For purposes of illustration only, example metrics or interaction data may include one or more of the following: amount of time taken to achieve goal or destination; number of errors; destinations or locations visited; date/time when actions are taken by trainee; number of items repaired; number of attacks detected by a defending team compared to total number of attacks; time taken to recover from a successful attack; number of attacks successfully identified; number of open ports/services detected by a scanning team compared to total number open; downtime of an attacked service compared to attack duration; average team time to accomplish a goal; and/or the time taken to gather all artifacts in a forensics exercise.

As shown in the example of FIG. 1, management server 2 includes database 8 and web server 6. In certain non-limiting examples, database 8 may comprise a standalone SQLite database that is linked to web server 6. Performance monitoring module 4 may include or use two sub-components: an aggregator and remote command modules, which are operable to interact with remote agents deployed across the test range network.

As one non-limiting example, a single instance remote command may be used for each one of trainee computing systems 20 in the test range network. These remote command processes or threads execute agents 14 on remote hosts and may receive agent output via, e.g., a Transmission Control Protocol (TCP) network connection. In some examples, agent output is formatted as Extensible Markup Language (XML) snippets, which provides a message-based communication format that is easily parsed and interpreted by monitoring and injection control system 4. In these examples, the XML messages may be piped via standard out (STDOUT) and standard error (STDERR) to the aggregator component of monitoring and injection control system 4, which saves them in the database 8 and also notifies event listeners for any actions to be taken. Web server 6 is updated by database 8, and evaluation dashboard module 12 may present the exercise status as a dynamic web page accessible by white team members.

As will be described in further detail below, one or more techniques of the present disclosure may provide a mechanism in which management server 2 (e.g., using web server 6 and/or content provider module 10) outputs, for display in a web browser of a trainee computing system (e.g., one of trainee computing systems 20, such as trainee computing system 20A), a graphical user interface that includes a list of one or more training exercises, where each of the one or more training exercises is associated with one or more skills to be demonstrated by a trainee using trainee computing system 20A during the respective training exercise.

Responsive to receiving a request from trainee computing system 20A to start a training exercise included in the list, management server 2 may initiate execution of one or more of software agents 14 that are associated with the one or more skills to be demonstrated by the trainee during the training exercise. Management server 2 may then output (e.g., using content provider module 10), to trainee computing system 20A, content corresponding to one or more scenes of an at least partially virtual environment for the training exercise, where the content is rendered for display at least in the web browser of trainee computing system 20A.

Management server 2 may receive (e.g., using performance monitoring module 4), from trainee computing system 20A during the training exercise, interaction data collected by agents 14, where the interaction data is associated with at least one interaction by the trainee with the content corresponding to the one or more scenes. Management server 2 may then determine (e.g., using performance monitoring module 4 and/or evaluation dashboard module 12) that the one or more skills associated with the training exercise have been demonstrated by the trainee.

Example implementations of management server 2, as described herein, may provide flexibility to work with a wide variety of cyber range platforms and cyber missions in the test range network that includes trainee computing systems 20. User interfaces and dashboards provided by exercise builder module 16 and evaluation dashboard module 12 may be user-friendly and workflow-driven to potentially decrease the burden of deployment and monitoring on white team members. Exercise builder module 16 may be configured to build, create, and/or manage training exercises via one or more dashboards output for display at evaluator computing systems 22, and evaluation dashboard module 12 may be configured to provide training evaluation capabilities via one or more dashboards that are output for display at evaluator computing systems 22.

The architecture may be extensible, customizable, secure, accessible, and robust. The design modularity can easily accommodate new training platforms and needs of specific users within the test range network, and agents 14 can be easily modified based on the architecture of the test range network and the specifics of particular training exercises. Agents 14 also may utilize encryption and out-of-band channels to guard against trainees "gaming the system," and are capable of recovering from network interruptions and host reboots. In addition, interfaces provided by management server 2 may be remotely accessible by evaluators using evaluator computing systems 22.

Figure 2:
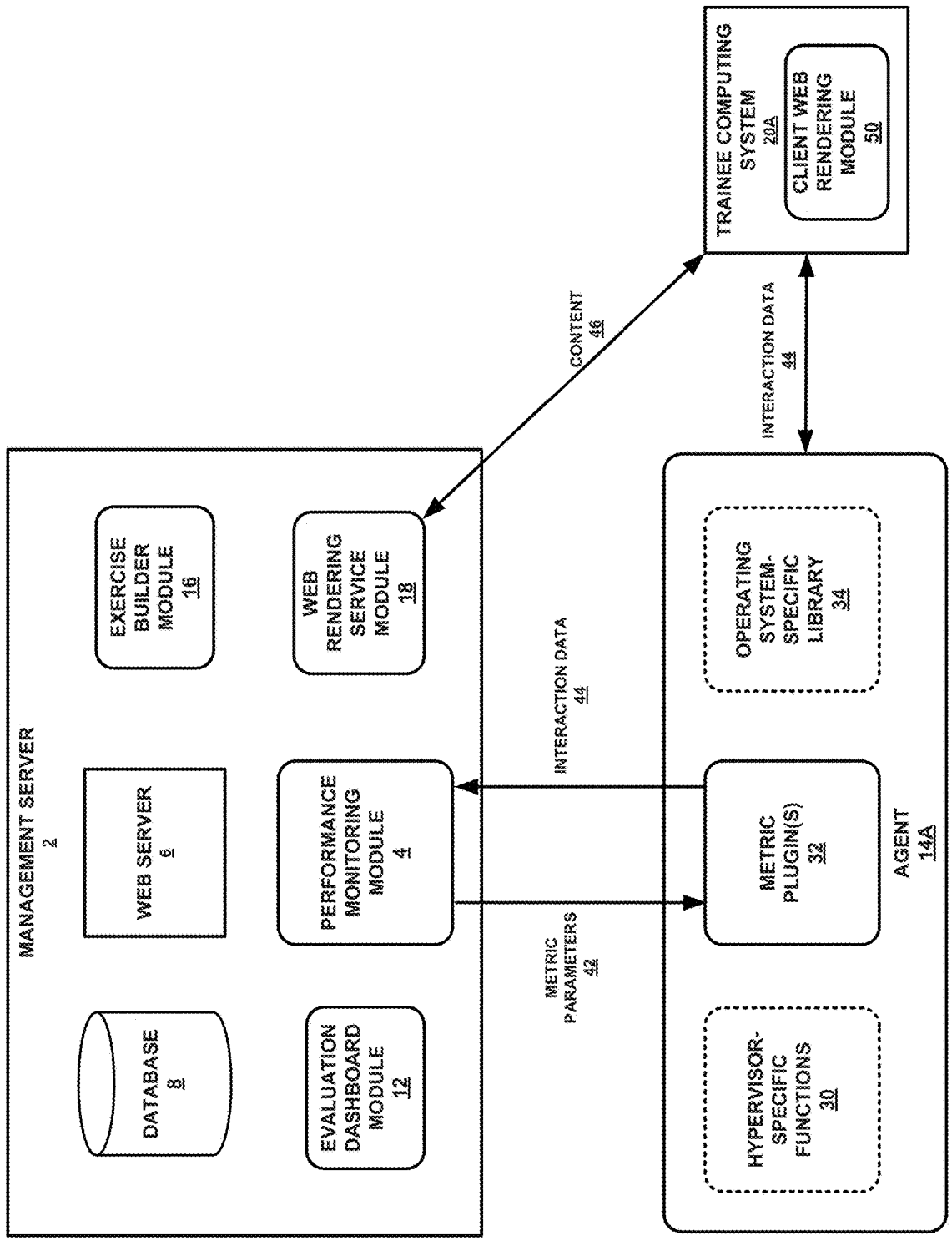
FIG. 2 is a block diagram illustrating further details of an example management server, an example agent, and an example trainee computing system, in accordance with one or more aspects of the present disclosure.

FIG. 2 is a block diagram illustrating further details of example management server 2, an example agent 14A, and an example trainee computing system 20A, in accordance with one or more aspects of the present disclosure. Agent 14A is an example of one of agents 14 illustrated in FIG. 1 that may be deployed by management server 2, and trainee computing system 20A is an example of one of trainee computing systems 20 illustrated in FIG. 1.

In the example of FIG. 2, the agent design provides the flexibility to run on a wide variety of target systems, such as trainee computing system 20A. In certain non-limiting examples, agents 14 may include one or more hypervisor agents, which are agents that do not deploy directly onto trainee computing systems 20 in the test range network, but instead onto virtual machine platforms that host trainee computing systems 20, and trainee computing systems 20 may comprise one or more virtual machines. Hypervisor agents may not leave any footprint (e.g., packets, network connections) on the exercise network for trainees to see. In the example of FIG. 2, agent 14A may, in some non-limiting cases, comprise a hypervisor agent that comprises one or more hypervisor-specific functions 30.

In these cases, hypervisor-specific functions 30 may provide access to the one or more virtual machines. In one example, a console can be established through a virtual machine's virtual serial port. In one example, a Virtual Machine Communications Infrastructure (VMCI) provides communication between a virtual machine and a host operating system of trainee computing system 20A using a socket interface. In one example, a Host-Guest Communication Manager (HGCM) allows a virtual machine to call a shared library on trainee computing system 20A.

In some examples, however, agent 14A may not comprise a hypervisor agent and may not include hypervisor-specific functions 30. In these examples, agent 14A may be deployed directly on trainee computing system 20A.

FIG. 2 shows that agent 14A can be equipped with a variety of one or more metric plugins 32 to collect and provide performance monitoring module 4 of management server 2 with interaction data 44 during a training exercise using trainee computing system 20A. Furthermore, these metric plugins 32 can be parameterized to further broaden their application for increased flexibility. Metric plugins 32 may be parameterized by receiving, for example, one or more metric parameters 42 from performance monitoring module 4.

Once deployed, an agent, such as agent 14A, is a program that executes and that may have a callback interface for returning information to performance monitoring module 4. In some cases, agent 14A may run with administrator privileges to ensure maximum access.

In general, agent 14A and metric plugins 32 can be written to provide a wide range of functions. The following are non-limiting examples of the types of agents that may be implemented: (1) general execution agent—an agent that runs an arbitrary shell command on trainee computing system 20A. This type of agent can be parameterized (e.g., by receiving metric parameters 42 from performance monitoring module 4) to return all stdout/stderr results from trainee computing system 20A or return only results including a regex. (2) process monitor agent—an agent that uses an application programming interface of the operating system of trainee computing system 20A to acquire a list of processes running on trainee computing system 20A. This type of agent can be parameterized to return the full list or only return processes that match a given regular expression. (3) remote connection agent—an agent that uses host computing system's network access to attempt connections to another host. This type of agent can be parameterized with the Internet Protocol address and port number of trainee computing system 20A, and optionally a client protocol to emulate, and the agent will return success or failure of the attempted connection, and can also return any packets received from trainee computing system 20A. (4) registry monitor agent—an agent that monitors the registry of trainee computing system 20A for key changes. This type of agent can be parameterized to monitor only keys matching a regex, and will return the new value of any keys. (5) time check agent—an agent that executes on each target (e.g., on trainee computing system 20A) at, e.g., the beginning of an exercise so management server 2 can record the time differentials between trainee computing systems 20 and management server 2 and accurately report monitoring results. The time check agent may be used in cases where the clocks of each of trainee computing systems 20 are not necessarily synchronized. Various other types of agents may be utilized, and additional examples of agents are described in further detail below.

The parameters listed in the non-limiting examples above, which may be included in metric parameters 42 shown in FIG. 2, are functional parameters. An agent's operational mode is another type of parameter that may be included in metric parameters 42. The principal modes for agents 14, according to certain examples, are to either terminate after executing their respective commands or to stay resident for the purposes of returning additional data at a later time. In the latter case, a persistent agent can either actively poll the state of trainee computing system 20A (e.g., to take repeated measurements) or use an operating system hook (e.g., via option operating-system specific library 34, which may be specific to the operating system used by trainee computing system 20A) to passively monitor trainee computing system 20A and wait for events. In various examples, agents 14, including agent 14A, are capable of running in each of these modes. Furthermore, one or more techniques for configuring and deploying agents 14 to acquire data from trainee computing systems 20 and provide such data to management server 2 are described in U.S. Patent Application Publication 20120210427 by Bronner et al, entitled "Configurable Investigative Tool," which is incorporated herein by reference in its entirety.

In some cases, interaction data 44 may indicate at least one event that is associated with at least one action that is performed by a trainee during a training exercise using trainee computing system 20A. In various examples, exercise builder module 16, evaluation dashboard module 12, performance monitoring module 4, and/or web rendering service module 18 may determine one or more metrics that are usable to determine if one or more skills have been demonstrated by a trainee during a training exercise, and identifying certain types of parameter data that can be collected by trainee computing system 20A in order to calculate these one or more metrics. Performance monitoring module 4 may then provide metric parameters 42 to configure metric plugins 32 of agent 14A to collect the parameter or interaction data, including interaction data 44, which is used to calculate these metrics for use by evaluation dashboard module 12. Performance monitoring module 4 and/or evaluation dashboard module 12 may then determine whether one or more skills represented by one or more skill nodes in a graphical dashboard, as will be described in further detail below, have been demonstrated by the trainee during the training exercise by calculating, based on interaction data 44, the one or more metrics to determine if the one or more skills have been demonstrated.

In certain other examples, a non-limiting list of agents and/or metric plugins for agents 14 utilized with respective ones of trainee computing systems 20 are described herein. For instance, various agents and/or metric plugins are shown in FIG. 5 and described further below. As an example, a file system monitor agent/plugin reports changes to files in a specific directory (and all subdirectories) for a given trainee computing system (e.g., trainee computing system 20A). A login test agent/plugin attempts to create a session (e.g., log in) with the user-specified log-in credentials. An email sender agent/plugin attempts to send a "test" email message to a specified server (e.g., Simple Mail Transfer Protocol server). A network connection list agent/plugin lists all active network connections on a trainee computing system. Various other examples are shown in FIG. 5.

In some cases, metric plugins 32 of agent 14A may collect interaction data 44 from trainee computing system 20A based on various actions that may be taken by a trainee during an exercise. For instance, interaction data 44 may indicate one or more interactions that a trainee has made with one or more interactive objects or elements that are included in a user interface provided as part of the training exercise (e.g., part of the virtual environment provided by web rendering service module 18). Metric plugins 32 may they provide corresponding interaction data 44 back to performance monitoring module 4. Web rendering service module 18 may, in various examples, provide 3D web rendering functions for one or more of virtual reality (e.g., WebVR), augmented reality (e.g., WebXR), and/or mixed reality training sessions.

As one example, if the training exercise relates to a flight simulation exercise, web rendering service module 18 may service up flight simulation content to client web rendering module 50. Client web rendering module 50 may render this content for display at trainee computing system 20A. This content may include various interactive elements or objects that the trainee may interact with during the exercise. Interaction data 44 may include data indicative of one or more actions taken by the trainee while interacting with the content, and/or other data associated with the exercise. For example, interaction data 44 current flight altitude information based on the actions taken by a trainee during flight simulation activities. Metric plugins 32 may provide, to performance monitoring module 4, interaction data 44 that includes flight altitude information, and may include additional metadata or alert information (e.g., an alert if the flight altitude drops below a specified threshold).

In utilizing management server 2, agent 14A, and trainee computing system 20A shown in FIGS. 1 and 2 for training, cyber exercises, a first step may comprise capturing the information about the cyber exercise that is used to set up monitoring and evaluation. Exercise builder module 16 may output a planning dashboard that leads the user (e.g., evaluator or instructor using an evaluation computing system, such as system 22 shown in FIG. 1) through a series of steps using, e.g., graphical tools, forms, and/or drop-down menus to facilitate the process. If the evaluators have not already set up a cyber exercise, it can use management server to specify a new one. In either case, the result of the first step may, in some cases, be a set of files in machine-parsable formats that contains the information about the exercise.

A second step may involve planning how the exercise will be monitored and how trainees evaluated. The planning dashboard can guide the user through another series of steps, from learning objectives to agent selection, as described in further detail below. The results will be, e.g., a monitoring plan in a machine-parsable format and the set of agents 14 that will collect metrics during the exercise.

According to one or more examples, the planning dashboard output exercise builder module 10 may include a back end and a front end. The back end may comprise one or more scripts that interact with database 8. Planning activities will generally populate database 8 with the results of exercise capture and the monitoring plan. However, some scripts will fetch information from database 8 to populate the user interface (e.g., to populate web forms with options for the user).

The front end may comprise be a web interface that allows evaluators or instructors to access management server 2 via evaluator computing systems 22 in a number of ways, such as wirelessly through tablets and smartphones. The three example steps of the workflow are exercise capture, monitoring planning, and briefing generation.

Exercise capture or creation may begin by, e.g., utilizing exercise builder module 16 to draw the cyber range network's hosts (e.g., trainee computing systems 20) and connections using a network builder interface (e.g., a drag-and-drop interface). Once the network topology is captured, the user of evaluator computing system 22 specifies details for one or more of trainee computing systems 20. The interface is operable to lead the user through this process starting with high-level information and working down to low-level information. At each step, the interface is populated with options for the user.

Monitoring planning begins with the user providing learning objectives for the exercise, utilizing an interface provided by exercise builder module 16 and/or performance monitoring module 4. The interface may lead the user through a series of steps to produce a detailed monitoring plan. The process is repeated until all learning objectives are covered, with sufficient fidelity for each objective. The iterative process may include the following operations for each objective: (1) identifying a high-level learning objective (e.g., security configuration); (2) identifying one or more skills that support the high-level objective (e.g., how to configure a firewall); (3) defining one or more metrics that can be used to determine if each skill is accomplished (e.g., the iptables firewall configuration is changed to block a port, or a port's state is changed from open to filtered); (4) identifying one or more observables/interaction data (e.g., interaction data 44 shown in FIG. 2), which can be collected from trainee computing systems 20 to calculate the metrics from interaction data 44 (e.g., a listing of the iptables configuration before and after a change (two measurements), or execution of the iptables command from the command line (an event)); (5) selecting an agent capable of collecting interaction data 44 (e.g., a binary execution agent or a file watching agent); and (6) configuring each agent with metric parameters (e.g., metric parameters 42 shown in FIG. 2) for the selected interaction data (e.g., the name of the binary to execute (iptables) and a regular expression (regex) to search for in the results (destination-port {PORT-NUMBER-HERE}-j DROP), or the name of the file to monitor for changes (/home/USERNAME/.bash_history) and a regex to search for in the results (iptables)). The operational mode of the agent, for example, may also be configured to execute measurement and then terminate, or to begin event monitoring then stay resident.

One of the potential strengths of cyber exercises is their emergent nature and unpredictability. Management server 2 accounts for this by allowing monitoring plans to be modified during exercises. For example, exercise builder module 16 may be configured to allow the planning dashboard to be re-visited while an exercise is in progress to design new agents on the fly or to adjust the assessment rubric.

Evaluation dashboard module 12 is configured to output an evaluation/monitoring dashboard that may be used in real-time during the course of a training exercise. The evaluation/monitoring dashboard may provide one or more user interfaces for each of its operating modes. Each operating mode may, in some cases, have separate views focused on network topology, learning objectives and agent data feeds. Each operating mode has different exercise controls; for example, in live mode, a user can start or stop monitoring, and in replay mode, the user can play back or pause agent telemetry.

In some examples, management server 2 outputs agent data in real time and displays it on a network diagram as it is received. For example, evaluation dashboard module 12 may output an evaluation/monitoring dashboard for display to a user (e.g., evaluator, instructor) via, e.g., evaluator computing system 22. When an agent sends new data from a host computing system to the interface (e.g., provided by monitoring and injection control system 4), the representation of that host in the dashboard may blink, and the number of pending agent reports is displayed. Users can click on the representation of the host to drill down to see detailed agent reports for the host.

As shown in FIG. 2, management server 2 also includes web rendering service module 18. Web rendering service module 18 is one example of content provider module 10 shown in FIG. 1. Web rendering service module 18 is capable of serving up content 46 (e.g., WebVR content) for output and display at a client web rendering module 50 of trainee computing system 20A. Client web rendering module 50 is configured to provide interaction data 44 back to agent 14A, which may then process the data and generate corresponding interaction data 44 that is sent to performance monitoring module 4 of management server 2, as described above. Web rendering service module 18 and client web rendering module 50 may each provide a compatible application programming interface (API), to enable flexibility and accessibility to clients. In various cases, web rendering service module 18 may output content (e.g., WebVR-enabled content) to client web rendering module 50. Client web rendering module 50 may then render this content for display at trainee computing system 20A. This content may correspond to one or more scenes of an at least partially virtual environment for the training exercise (e.g., a flight simulation virtual environment). The content may be rendered for display in a web browser of trainee computing system 20A.

Figure 3:
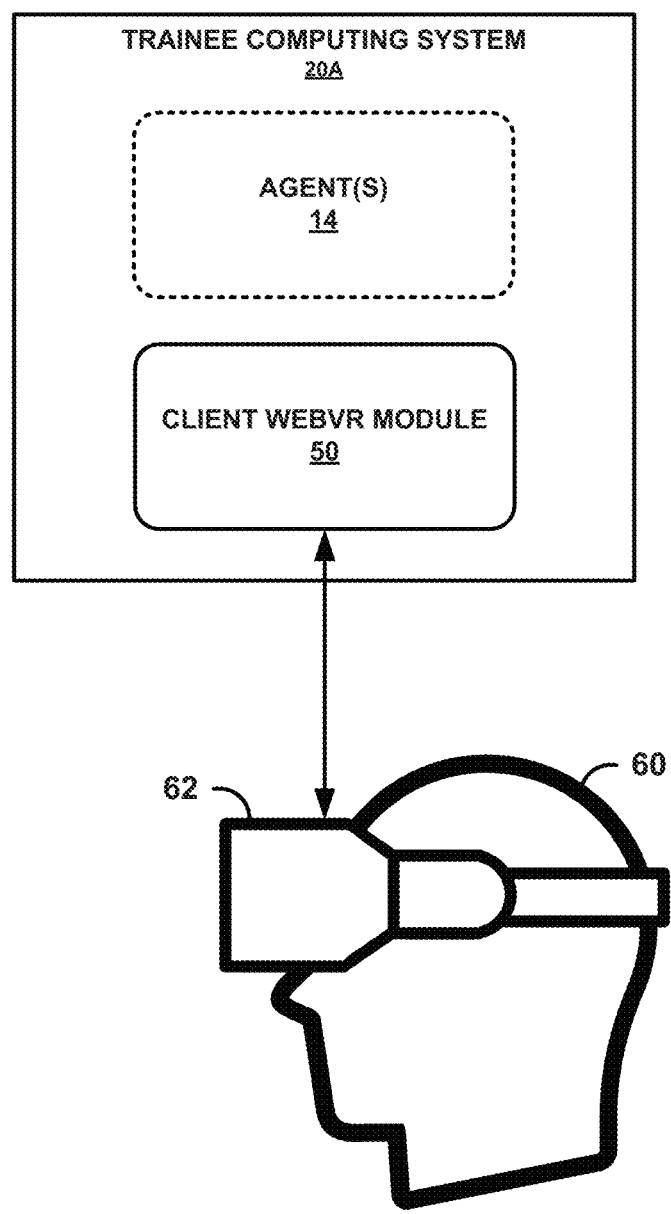
FIG. 3 is a diagram illustrating an example trainee computing system communicatively coupled to a head-mounted display of a user, in accordance with one or more aspects of the present disclosure.

FIG. 3 is a diagram illustrating an example trainee computing system 20A communicatively coupled to a head-mounted display 62 of a user (e.g., trainee) 60, in accordance with one or more aspects of the present disclosure. As previously described above in reference to FIG. 2, client web rendering module 50 of trainee computing system 20A may receive content from web rendering service module 18 of management server 2. Client web rendering module 50 may then render this content for display (e.g., in a web browser) at trainee computing system 20A. In certain examples, one or more agents 14 may collect interaction data 44 from trainee computing system 20A based on a trainee's actions during a training exercise, as described previously.

Figure 7:
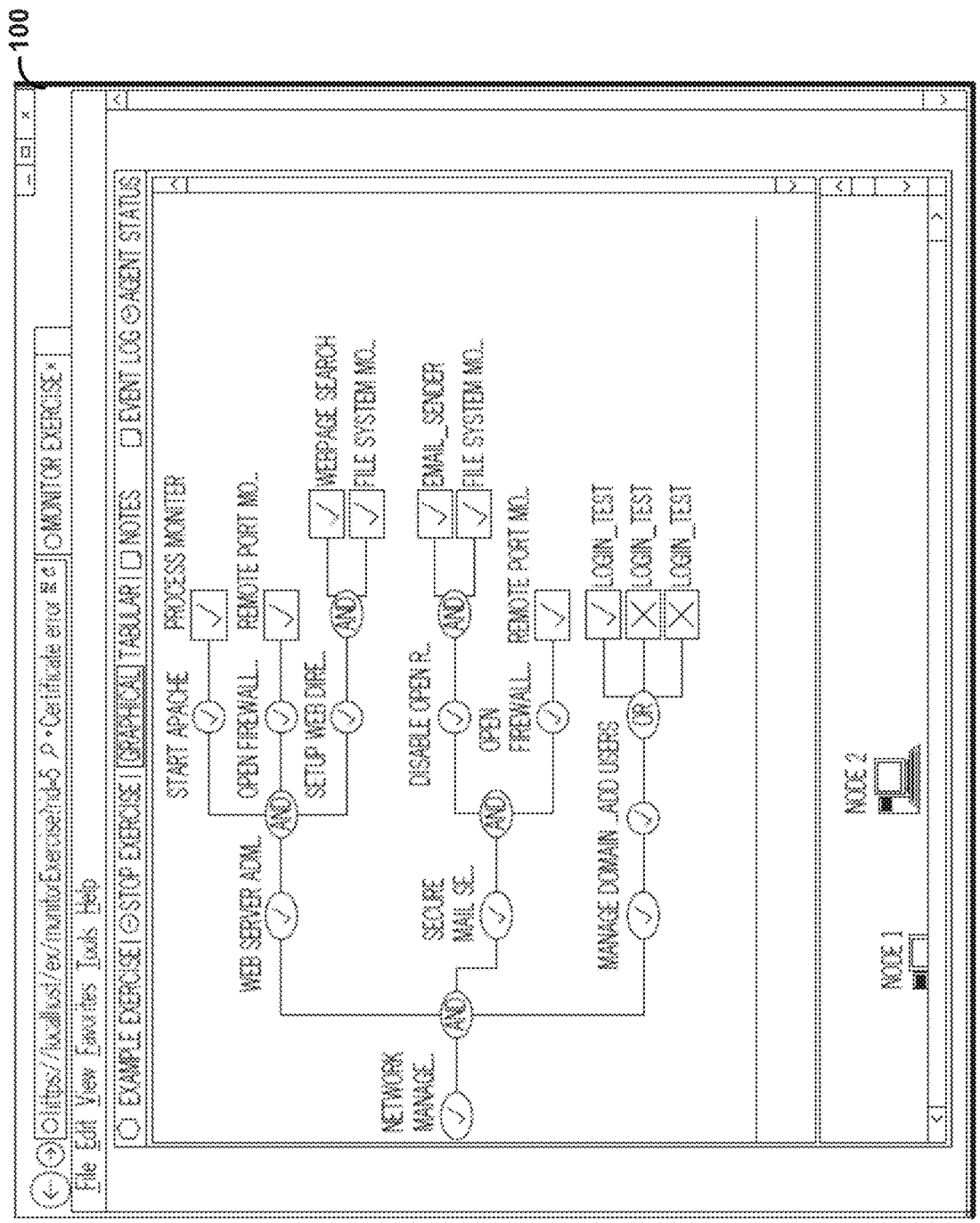
FIG. 7 is a screen diagram illustrating an example of an evaluation dashboard, in accordance with one or more aspects of the present disclosure.

In addition to rendering the received content for output at a web browser of trainee computing system 20A, client web rendering module 50 may also render the received content for output at head-mounted display 62 of trainee 60. Head-mounted display 62 may be communicatively coupled (e.g., wirelessly coupled) to client web rendering module 50 of trainee computing system 20A. Head-mounted display 62 may be a device (e.g., WebVR enabled device) that is configured to communicate with client web rendering module 50 via one or more application programming interfaces (API's) to receive rendered content for display to trainee 60. Client web rendering module 50 may be configured, for example, to detect the presence of head-mounted display 62 and query its device capabilities. Head-mounted display 62 may be configured to display rendered content provided by client web rendering module 50 at a determined frame rate during a training exercise. In addition, during the exercise, client web rendering module 50 may receive information about the position and/or orientation of head-mounted display 62 as trainee 60 moves and interacts with content that is displayed on head-mounted display 62. Based on this information, trainee computing system 20A (e.g., using client web rendering module 50) may generate event or interaction data for use by agents 14 (e.g., interaction data 44 shown in FIG. 3), and agents 14 may provide the interaction data to performance monitoring module 4 of management server 2. Evaluation dashboard module 12 may then include trainee and evaluation information in corresponding dashboards that are output for display at evaluator computing system 22 (such as shown in the example of FIG. 7 and described further below).

In some examples, although not shown in FIG. 3, trainee computing system 20A may include one or more other modules, in addition to client web rendering module 50, that provide support for augmented reality and/or mixed reality. In these examples, these one or more other modules may render content received from content provider module 10 (FIG. 1), where the rendered content comprises one or more of augmented content or mixed reality content, which may be output in a web browser of trainee computing system 20A and/or at head-mounted display 62. This content may correspond to the one or more scenes of an at least partially virtual environment and an at least partially real-world environment that is output for display.

Figure 8:
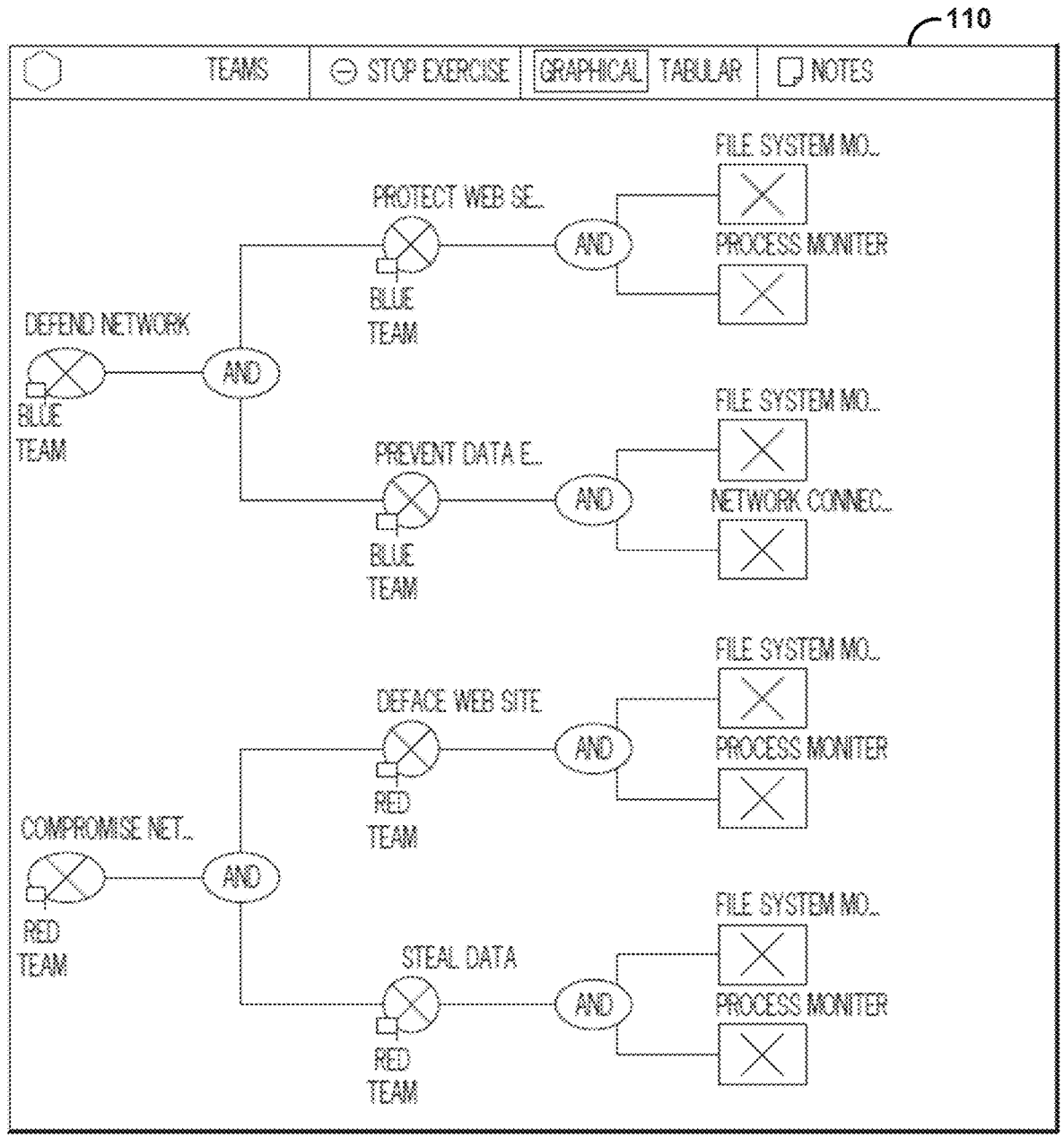
FIG. 8 is a screen diagram illustrating another example of an evaluation dashboard for a team environment, in accordance with one or more aspects of the present disclosure.

In some instances, a given training exercise may comprise a team-based exercise in which multiple different trainees participate. In these instances, the trainees may be included in one or more teams, and each trainee may use one of trainee computing systems 20. Trainee computing system 20A may be one example of a trainee computing system that is used by each a trainee in these team-based exercises, and each trainee (e.g., user 60) may wear a corresponding head-mounted display 62 while participating in these exercises. The agents 14 may then provide corresponding interaction data 44 back to performance monitoring module 4 for each trainee, and evaluation dashboard module 12 may include trainee and team-based information in corresponding dashboards that are output for display at evaluator computing system 22 (such as shown in the example of FIG. 8).

FIG. 4A is a screen diagram illustrating an example graphical window that includes multiple selectable training exercises, in accordance with one or more aspects of the present disclosure. In the example of FIG. 4A, graphical window 70 may be output for display in a web browser at one of trainee computing systems 20, such as trainee computing system 20A. As shown, graphical window 70 includes a group of selectable training exercises 1-N. A trainee may interact with the graphical user interface to select one of these training exercises in graphical window 70 and initiate execution of the corresponding exercise. As one example, training exercise 1 may be a flight simulator exercise, and exercise N may be a power grid training exercise. Any number of different exercises may be included in the list of graphical window 70, and these exercises may be created and/or configured by an exercise builder module (e.g., exercise builder module 16).

Upon selection of an exercise, trainee computing system 20A may begin rendering content associated with the exercise. For example, client web rendering module 50 (FIG. 2) of trainee computing system 20A may receive content 46 from web rendering service module 18 of management server 2, as described previously in reference to FIG. 2. Client web rendering module 50 may render content 46 for display in a web browser of trainee computing system 20A. If trainee computing system 20A is communicatively coupled to a head-mounted VR display worn by the trainee (e.g., head-mounted display 62 shown in FIG. 3), client web rendering module 50 may also output the rendered content for display at head-mounted display 62.

Upon interaction by the trainee with the rendered content, which may include one or more scenes of an at least partial virtual environment for the selected training exercise, one or more agents, such as agent 14A, may receive interaction data 44 associated with these interactions. For example, if the training exercise is a flight simulation exercise, interaction data 44 may include information about various actions the trainee has taken during the flight simulation, and various state information associated with these actions and/or the flight, such as flight altitude, speed, direction, time of travel, direction of travel, and the like. Agent 14A may send interaction data 44 to performance monitoring module 4 of management server 2, and evaluation dashboard module 12 of management server 2 may update one or more dashboards that track the trainee's progress and performance, as described in further detail below. The dashboards output by evaluation dashboard module 12 may be output to an evaluator computing system, such as one of evaluator computing systems 22.

Figure 4B:
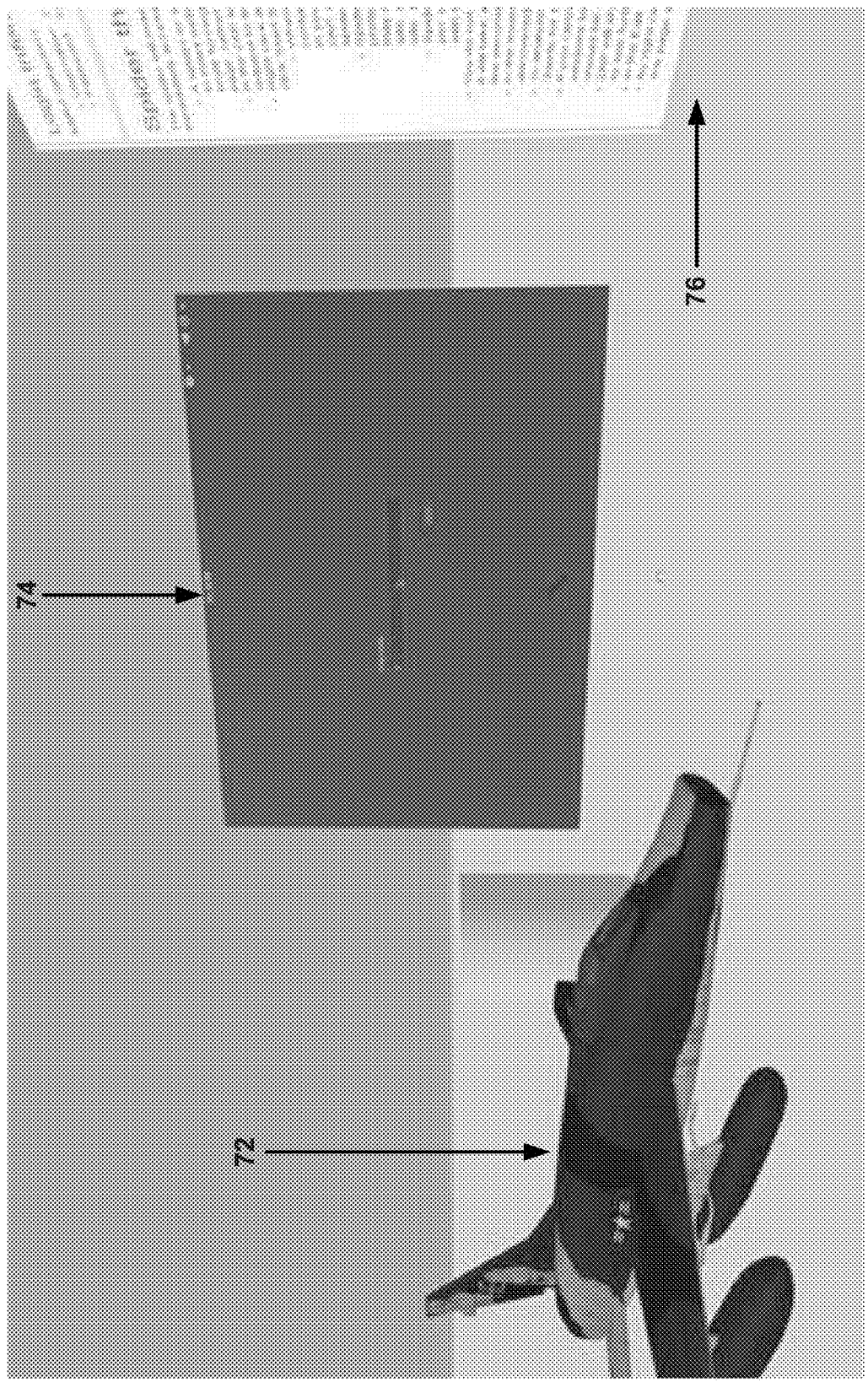
FIG. 4B is a screen diagram illustrating an example screenshot of virtual training content, in accordance with one or more aspects of the present disclosure.

FIG. 4B is a screen diagram illustrating an example screenshot of virtual training content, in accordance with one or more aspects of the present disclosure. In the example of FIG. 4B, it is assumed that the user has selected one of the training exercises included in the list of graphical window 70 that corresponds to a flight simulator exercise. Upon selection of this exercise, trainee computing system 20A may begin rendering content associated with the exercise. For example, client web rendering module 50 (FIG. 2) of trainee computing system 20A may receive content 46 from web rendering service module 18 of management server 2. Client web rendering module 50 may render content 46 for display in a web browser of trainee computing system 20A. As indicated above, if trainee computing system 20A is communicatively coupled to a head-mounted VR display worn by the trainee (e.g., head-mounted display 62 shown in FIG. 3), client web rendering module 50 may also output the rendered content for display at head-mounted display 62.

As shown in the example of FIG. 4B, the rendered content may comprise 3D content that corresponds to one or more scenes of an at least partially virtual environment for the flight simulator exercise. The content may include rendered content 72 for an airplane, rendered content 74 for a window or browser associated with, e.g., a server or virtual machine, and rendered content 76 for exercise instructions associated with the exercise. The user or trainee may interact with any of content 72, 74, and/or 76. For instance, the trainee may interact with a web browser output by trainee computing system 20A, and/or may move or interact with head-mounted display 62 (e.g., via eye/head movement, audio/tactile input, etc.) to interact with content 72, 74, and/or 76.

As an example, the trainee may cause content 72 associated with the airplane to move, change orientation, change status, investigate, or otherwise interact with content 72 within the one or more scenes that are output for display. The trainee may interact with content 74 to view, move, input data into, or otherwise interact with the window or browser associated with content 74. The trainee may interact with content 76 to view, move, input data into, or otherwise interact with the instructions associated with content 76. As the trainee interacts with content 72, 74, and/or 76, trainee computing system 20A and/or head-mounted display 62 may interact with web rendering service module 18, which may provide updated content 46 that is rendered for display at trainee computing system and/or head-mounted display 62.

In addition, upon interaction by the trainee with the rendered content 72, 74, and/or 76, one or more agents, such as agent 14A, may receive interaction data 44 associated with these interactions. For example, in the example of FIG. 4B, interaction data 44 may include information about various actions the trainee has taken during the flight simulation, and various state information associated with these actions and/or the flight, such as flight altitude, speed, direction, time of travel, direction of travel, and the like, and/or any interactions with content 72, 74, and/or 76. Agent 14A may send interaction data 44 to performance monitoring module 4 of management server 2, and evaluation dashboard module 12 of management server 2 may update one or more dashboards that track the trainee's progress and performance, as described in further detail below. The dashboards output by evaluation dashboard module 12 may be output to an evaluator computing system, such as one of evaluator computing systems 22.

FIG. 5 is a screen diagram illustrating an example window 80 displaying a list of agents and/or plugins for agents, in accordance with one or more aspects of the present disclosure. In various examples, graphical window 80 may be output by exercise builder module 16 and/or evaluation dashboard module 12, for display at evaluator computing systems 22, in order to configure agents 14 (e.g., metric plugins 32 of agent 14A).

A non-limiting list of agents and/or metric plugins for agents 14 are illustrated in graphical window 80 of FIG. 5. As indicated in the example of FIG. 5, a file system monitor agent/plugin reports changes to files in a specific directory (and all subdirectories) for a given trainee computing system, such as trainee computing system 20A. A login test agent/plugin attempts to create a session (e.g., log in) with the user-specified log-in credentials. An email sender agent/plugin attempts to send a "test" email message to a specified server (e.g., Simple Mail Transfer Protocol server). A network connection list agent/plugin lists all active network connections on trainee computing system 20A. A network connection monitor agent/plugin monitors network connections with a trainee computing system 20A. A process list agent/plugin is configured to list currently running processes on trainee computing system 20A. A process monitor agent/plugin monitors running processes on trainee computing system 20A and reports when processes whose name matches a user-specified pattern starts or stops.

As also indicated in graphical window 80 of FIG. 5, a program list agent/plugin lists installed applications on a given trainee computing system 20A. A registry monitor agent/plugin reports when changes are made to a registry (e.g., Windows registry) of trainee computing system 20A. A remote port monitor agent/plugin checks for open network ports on remote hosts and attempts to establish a network connection to a remote host on a specified port. Examples of how this plugin can be used include checking if services (e.g., web or ssh servers) are or are not running or if a firewall is configured property. A session monitor agent/plugin monitors active user sessions (e.g., looks for currently logged-on users). A webpage search agent/plugin attempts to retrieve a web page from a remote host, and can optionally search the returned data for a user-specified regular expression.

FIG. 6 is a screen diagram illustrating an example window 90 of an agent configuration form, in accordance with one or more aspects of the present disclosure. As described above, each agent may be configurable to perform different tasks. A user (e.g., trainer, evaluator) may use the agent configuration form to set up or otherwise configure an individual agent. For example, graphical window 90 may be displayed at one of evaluator computing systems 22 based on information received from management server 2 (e.g., information received from exercise builder module 16 and/or performance monitoring module 4).

In section (1) of the form included in graphical window 90, the user (e.g., evaluator or trainer) may select an individual agent (e.g., enter a new agent name of select the type of agent from a drop-down menu). In the example of FIG. 6, the user has selected the agent named "File System Monitor." The contents fields or sections named "Agent Options" (3) and "Evaluation Criteria" (4) in the form may change based on which agent is selected.

In section (2) of the form, the user may specify the number of points earned by the student when the agent returns data that is evaluated to true. Using section (3), the user may specify various options for an agent. The fields in section (3) determine how the agent runs and what data it looks for. In the example of FIG. 6, the File System Monitor agent monitors the indicated Directory using the indicated file name filter. Agent options can be numbers, strings, or regular expressions.

In section (4) of the form of FIG. 6, the user may specify various evaluation criteria for the agent. The evaluation criteria section allows the user to identify what data is used to evaluate student performance. This is discussed in more detail below. In section (5) of the form, a drop-down menu is provided to select which computer in the exercise network (e.g., one or more of trainee computing systems 20) the agent should be sent to.

Regarding the agent evaluation criteria, each agent may be configured to return tagged data that can be used to determine if the trainee actions are correct. FIG. 6 shows example evaluation criteria section for the "File System Monitor" agent. Each piece of tagged data returned by an agent can be evaluated to either True or False. In this example, the "File System Monitor" returns four pieces of tagged data (the labels in FIG. 6 are the tags used by the agent): "path," "status," "renamed to," and "change type." The center column is a drop-down menu with evaluation operations. Agents return either strings or numbers and the evaluation operations available reflect the data type.

To evaluate strings, example operations are the following: (a) "Contains": the Contains operation returns True if the data contains the user-specified substring; (b) "Equals": the Equals operation returns True if the data is the same as the user-specified string; and (c) "Not Equals": the Not Equals operation returns True if the data is different from the user-specified string.

To evaluate numbers (e.g., integers), example available operations are the following: (a) "Equals;" (b) "Not Equals;" (c) "Less than;" (d) "Greater than;" (e) "Less than or equal to;" and (f) "Greater than or equal to."

In various examples, during evaluation of agent data, the value of each field may be checked or monitored. If each operation results in True, then the agent as a whole evaluates to True.

FIG. 7 is a screen diagram illustrating an example of an evaluation dashboard 100, in accordance with one or more aspects of the present disclosure. Evaluation dashboard 100 may be one example of a dashboard that is output by evaluation dashboard module 12, of management server 2, for display at evaluator computing system 22. An evaluator or instructor using evaluator computing system 22 to view and interact with evaluation dashboard 100.

In some examples, the use of evaluation dashboard 100 may have various purposes, such as monitoring an exercise, assessing trainee performance, and/or preparing debriefing documents. Because data collected by agents 14 during an exercise can be viewed in real time or after the fact, the monitoring and assessment tasks may share the same interfaces.

The views and information provided by and included in evaluation dashboard 100 indicate the progress that trainees are making towards the exercise learning objectives and skills. It indicates the relationships between learning objectives, skills, and/or metrics that were created using one or more dashboards created by exercise builder module 16 and/or evaluation dashboard module 12, and may present this information in a directed graph. The learning view (e.g., graphical tree) represented in dashboard 100 enables an instructor to define high level objectives for an exercise, skills that a student or trainee should demonstrate that supports those objectives, and/or agents that report when skills have been demonstrated.

The learning view of dashboard 100 may be represented as a learning objective tree with multiple nodes that indicate objectives, skills, agents, and operators (e.g., logical AND or OR operators). These nodes may be referred to as learning objective nodes, skill nodes, agent nodes, and operator nodes, respectively. A user may select (e.g., drag and drop) these nodes into the dashboard workspace to build the learning objective tree. Learning objective nodes (e.g., ovals) represent high-level goals or objectives for the training exercise of the student. As indicated above, learning objectives can be multilevel. Skill nodes (e.g., circles) represent concrete, but potentially still high level, actions the student should take during the exercise. Agent nodes (e.g., squares) represent configurable software components, or agents, that monitor and report activity on trainee computing systems (e.g., trainee computing systems 20) in an exercise. Operator nodes (e.g., oval-shaped operator nodes representing logical "AND" or "OR" operations) represent operations associated with or between objective nodes, skill nodes, and/or agent nodes in the learning objective tree.

The example learning objective tree illustrated in dashboard 100 of FIG. 7 may be built from a root learning objective node(s) (e.g., objective node labelled "network manage . . . " in FIG. 7) to one or more "leaf" agent nodes (e.g., agent node labelled "webpage search"). To start building a tree, or to add to an existing tree, a user may drag a node from a palette into the workspace of dashboard 100. The user may also form associations between nodes by placing or inserting connections (e.g., lines or other similar connectors) between nodes, as illustrated in FIG. 7.

The user may place one or more constraints on the tree or to hierarchical relationships between tree nodes, and the nodes may form a hierarchy of parent and children nodes. In some cases, the dashboard and/or learning view may enforce certain rules when a user builds a hierarchy of tree nodes. One non-limiting set of rules are shown in Table 1 below:

TABLE 1

EXAMPLE RULES/POLICY FOR NODE HIERARCHY

| Parent Node | Children Nodes |
| --- | --- |
| Objective | Objectives AND/OR Skills |
| Skill | AND/OR Agents |
| Agent | No child nodes allowed |

As shown in Table 1, no child nodes are allowed for agent parent nodes. Skill nodes may have agent nodes and/or operator nodes as child nodes. Objective nodes may have other objective nodes, skill nodes, and/or operator nodes as child nodes.

In the example of FIG. 5, based on the node configuration hierarchies and indicated operator nodes, the objective "network manage . . . " is achieved if all the objectives "web server adm . . . ," "secure mail se . . . ," and "manage domain" are achieved. The objective "web server adm . . . " is achieved is all of the skills "start apache," "open fire wall . . . ," and "setup web dire . . . " have been demonstrated. The objective "secure mail se . . . " is achieved if both the skills "disable open r . . . " and "open firewall . . . " have been demonstrated. The objective "manage domain" is achieved if the skill "_add users" has been demonstrated. Corresponding agent nodes, shown in squares of dashboard 100, are assigned and associated with the various skill nodes, and skill nodes may be coupled to certain agent nodes via operator nodes, as well. For example, the agent nodes for the agents "webpage search" and "file system mo . . . " are coupled to the skill node for the skill "setup web dire . . . " via an "AND" operator node, indicating that these agents must provide successful results in order for the skill "setup web dire . . . " to be demonstrated by the trainee. These agents may provide successful results by collecting interaction data (e.g., interaction data 44) indicating that the trainee has taken certain actions during an exercise, has completed the exercise fully and/or successfully, that the exercise completed without error conditions or states, the trainee completed a mission within a defined time window, and the like, such as when the interaction data satisfied defined evaluation criteria, which may be provided by the evaluator or instructor.

In the example of FIG. 7, the learning view shown in dashboard 100 may be updated during the course of a training exercise as one or more agents return interaction data (e.g., interaction data 44) to performance monitoring module 4 of management server 2, and as performance monitoring module 4 and/or evaluation dashboard module 12 determine whether agent evaluation criteria have been satisfied, and accordingly whether one or more skills have been demonstrated or objectives achieved. Initially, the learning objective, skill, and agent nodes may be displayed in an initial representation or color (e.g., red) and/or have an "X" displayed in them to graphically indicate that the represented objective has not been accomplished, the represented skill has not been yet demonstrated, and/or the represented agent has not yet collected and/or provided interaction data that satisfies the corresponding criteria.

As the agents return interaction data that evaluate to True, based on the defined evaluation criteria, the learning objective tree is evaluated and nodes change to another color (e.g., green) and/or change the "X" within the respective nodes to a checkmark, graphically indicating a true, or "pass," evaluation. The screen diagram illustrated in FIG. 7 shows a more complicated learning objective tree with evaluated results.

In some examples, learning objective trees follow standard logic rules for "AND" and "OR" operators. For an "AND" operator, and for a given node N, N is true if and only if all child nodes are true. For an "OR" operator, and for a given node N, N is true if one or more children nodes are true.

In the example illustrated in FIG. 7, many of the objective nodes, skill nodes, and agent nodes have checkmarks included inside the respective nodes (and may, in some cases, be colored green), indicating that represented objectives have been accomplished, represented skills have been demonstrated, or that represented parameter data provided by an agent satisfies corresponding evaluation criteria. However, two agent nodes in FIG. 7 have an "X" displayed in them, indicating that the interaction data provided by these represented agents has not satisfied the corresponding evaluation criteria. These two agent nodes are coupled to a skill node labelled "_add users." This skill node, however, is also coupled to a third agent node that has a checkmark next to it, indicating that the interaction data provided by this agent satisfied the corresponding criteria. Because these three agent nodes are coupled to the skill node "_add users" via an "OR" operator node, the skill for this skill node has been demonstrated. In FIG. 7, the highest-level objective labelled "network manage . . . " has been achieved by the trainee, because corresponding skills have been demonstrated based on interaction data collected by the respective agents, per the rules of the objective tree and the various indicated operator nodes between objective, skill, and agent nodes. Thus, the use of evaluation dashboard 100 may have various purposes, such as monitoring an exercise, assessing trainee performance, and/or preparing debriefing documents. Data collected by agents 14 during an exercise can be viewed in real time or after the fact, and the views and information provided by and included in evaluation dashboard 100 indicate the progress that trainees are making towards the exercise learning objectives and skills.

FIG. 8 is a screen diagram illustrating another example of an evaluation dashboard 110 for a team environment, in accordance with one or more aspects of the present disclosure. Similar to dashboard 100 shown in FIG. 7, dashboard 110 may be one example of a dashboard that is output by evaluation dashboard module 12 for display at evaluator computing system 22. An evaluator or instructor using evaluator computing system 22 to view and interact with evaluation dashboard 100.

As noted earlier, certain training exercises may comprise team exercises that involve various trainees. When running a team exercise, the learning objective and skill nodes may display a team flag. The learning view of FIG. 8 is similar in format to that shown in the example of FIG. 7, where individual nodes have a particular color or include an "X" for corresponding objectives that have not yet been accomplished, skills that have not yet been demonstrated, and/or agents whose evaluation criteria have not yet been satisfied. In addition, logical operators (e.g., "AND" operators, "OR" operators) may be associated with one or more of the nodes in the hierarchy.

However, individual nodes may be assigned to teams within the tree. In particular, learning objective nodes and skill nodes may be assigned to teams, based upon which corresponding objectives and skills have been assigned to which teams. In the particular example of FIG. 8, the objective of "Defend Network" is assigned to the "Blue" team, as indicated by text and/or a blue flag (or other representation associated with the "Blue" team), which is located adjacent to the learning objective node representing the "Defend Network" objective, as indicated in FIG. 8. The objective of "Compromise Net . . . " (Compromise Network) is assigned to the "Red" team, as indicated by text and/or a red flag (or other representation associated with the "Red" team), which is located adjacent to the learning objective node for the "Compromise Net . . . " learning objective.

Similarly, the skills of "Protect Web Se . . . " and "Prevent Data E . . . " are assigned to the "Blue" team, as indicated by text and/or blue flags (or other representations associated with the "Blue" team), which are located adjacent to the skill nodes representing the "Protect Web Se . . . " and "Prevent Data E . . . " skills. The skills of "Deface Web site" and "Steal Data" are assigned to the "Red" team, as indicated by text and/or red flags (or other representations associated with the "Red" team), which are located adjacent to the skill nodes representing the "Deface Web site" and "Steal Data" skills.

Various logical operator nodes may be coupled to various other objective, skill, and/or agent nodes in the tree of dashboard 110, similar to that shown in FIG. 7. As shown in FIG. 8, all of the objective, skill, and agent nodes have an "X" shown within them, indicating that the agents have not yet collected interaction data to satisfy corresponding evaluation criteria, the skills associated with the skill nodes have not yet been demonstrated, and the objectives associated with the objective nodes have not yet been achieved. The nodes in dashboard 110 may be updated over time during the course of the exercise, and as trainees from both the blue and red teams perform actions while interaction with content presented for the exercise, similar to that described in reference to FIG. 7.

Figure 9:
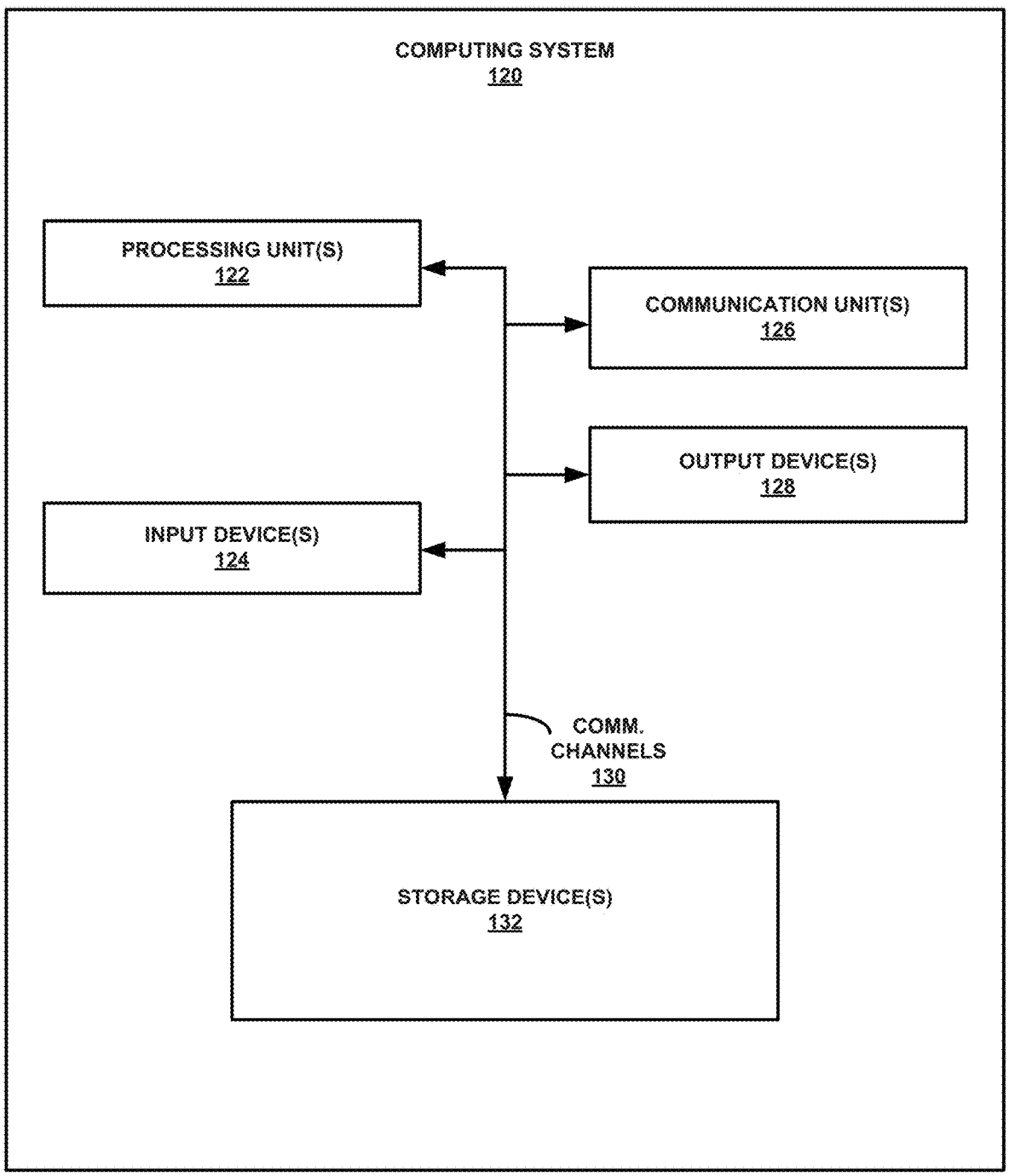
FIG. 9 is a block diagram illustrating further details of an example computing system, in accordance with one or more aspects of the present disclosure.

FIG. 9 is a block diagram illustrating further details of an example computing system 120, such as one or more of the computing systems (e.g., management server 2, evaluator computing systems 22, trainee computing systems 20) shown in FIGS. 1-3, in accordance with one or more aspects of the present disclosure. FIG. 9 illustrates only one particular example of computing system 120, and many other examples of computing system 120 may be used in other instances and may include a subset of the components shown, or may include additional components not shown, in FIG. 9.

As shown in the example of FIG. 9, computing system 120 includes one or more processing units 122, one or more input devices 124, one or more communication units 126, one or more output devices 128, and one or more storage devices 132. Communication channels 130 may interconnect each of the components 122, 124, 126, 128, and 132 for inter-component communications (physically, communicatively, and/or operatively). In some examples, communication channels 130 may include a system bus, a network connection, an inter-process communication data structure, or any other method for communicating data between hardware and/or software.

One or more input devices 124 of computing system 120 may receive input. Examples of input are tactile, audio, and video input. Examples of input devices 124 include a presence-sensitive screen, touch-sensitive screen, mouse, keyboard, voice responsive system, video camera, microphone or any other type of device for detecting input from a human or machine.

One or more output devices 128 of computing system 120 may generate output. Examples of output are tactile, audio, and video output. Examples of output devices 128 include a presence-sensitive screen, sound card, video graphics adapter card, speaker, cathode ray tube (CRT) monitor, liquid crystal display (LCD), or any other type of device for generating output to a human or machine. Output devices 128 may include display devices such as cathode ray tube (CRT) monitor, liquid crystal display (LCD), or any other type of device for generating tactile, audio, and/or visual output.

One or more communication units 126 of computing system 120 may communicate with one or more other computing systems or devices via one or more networks by transmitting and/or receiving network signals on the one or more networks. Examples of communication unit 126 include a network interface card (e.g. such as an Ethernet card), an optical transceiver, a radio frequency transceiver, or any other type of device that can send and/or receive information, such as through a wired or wireless network. Other examples of communication units 126 may include short wave radios, cellular data radios, wireless Ethernet network radios, as well as universal serial bus (USB) controllers.

One or more storage devices 132 within computing system 120 may store information for processing during operation of computing system 120 (e.g., computing system 120 may store data accessed by one or more modules, processes, applications, or the like during execution at computing system 120). In some examples, storage devices 132 on computing system 120 may be configured for short-term storage of information as volatile memory and therefore not retain stored contents if powered off. Examples of volatile memories include random access memories (RAM), dynamic random-access memories (DRAM), static random access memories (SRAM), and other forms of volatile memories known in the art. In some cases, storage devices 48 may include redundant array of independent disks (RAID) configurations and one or more solid-state drives (SSD's).

Storage devices 132, in some examples, also include one or more computer-readable storage media. Storage devices 132 may be configured to store larger amounts of information than volatile memory. Storage devices 132 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage devices 132 may store program instructions and/or data associated with one or more software/firmware elements or modules.

For example, when computing system 120 comprises an example of management server 2 shown in FIGS. 1-2, storage devices 120 may store instructions and/or data associated with database 8, agents 14, performance monitoring module 4, web server 6, exercise builder module 16, evaluation dashboard module 12, content provider module 10, hypervisor-specific functions 30, metric plugins 32, and/or operating system-specific library 34. In another example, when computing system 120 comprises an example of one of trainee computing systems 20 shown in FIGS. 1-3 (e.g., trainee computing system 20A), storage devices 120 may store instructions and/or data associated with agents 14 and/or client web rendering module 50.

Computing system 120 further includes one or more processing units 122 that may implement functionality and/or execute instructions within computing system 120. For example, processing units 122 may receive and execute instructions stored by storage devices 132 that execute the functionality of the elements and/or modules described herein. These instructions executed by processing units 122 may cause computing system 120 to store information within storage devices 132 during program execution. Processing units 122 may also execute instructions of the operating system to perform one or more operations described herein.

Figure 10:
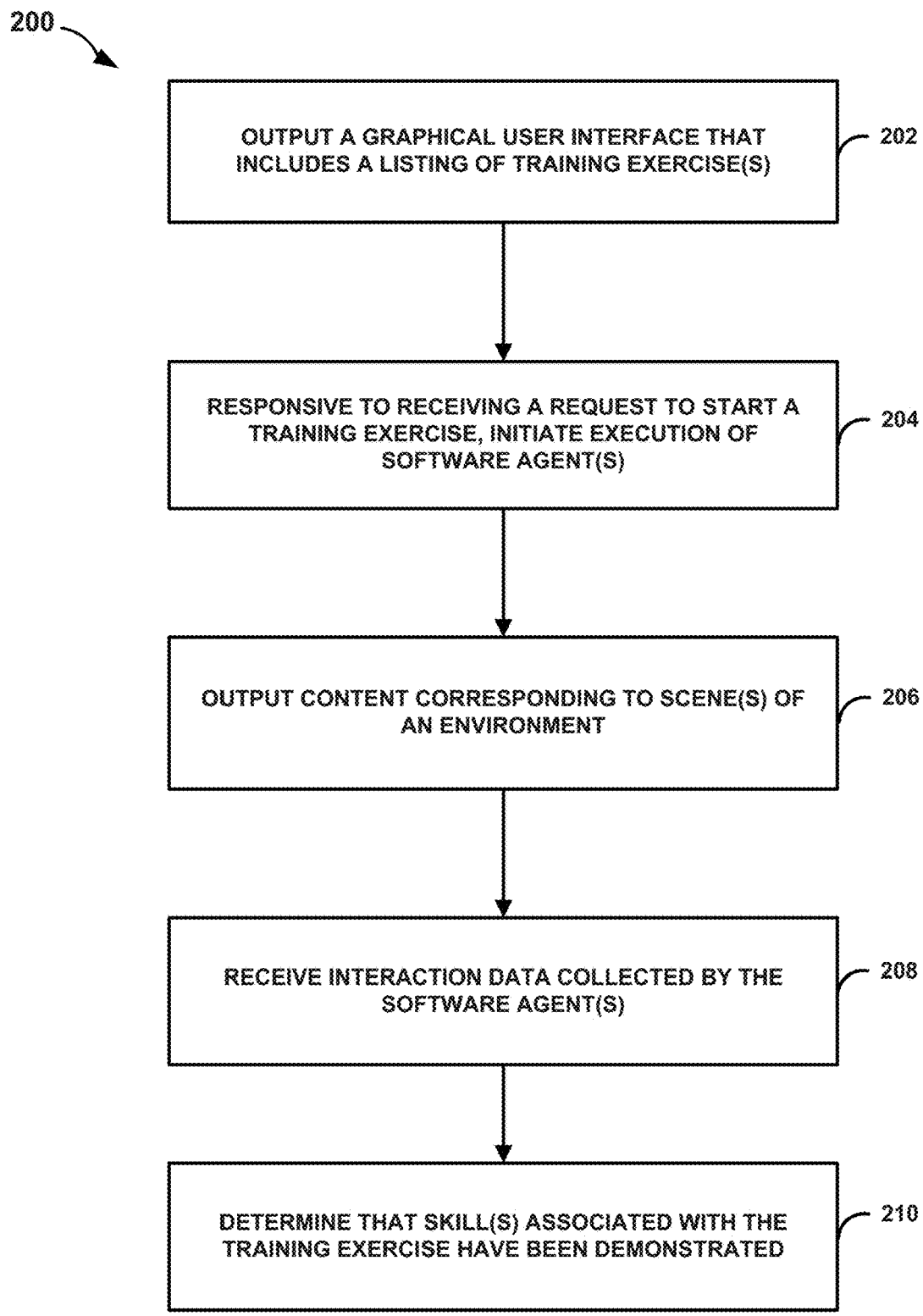
FIG. 10 is a flow diagram illustrating an example process that may be performed by a management server, in accordance with one or more aspects of the present disclosure.

FIG. 10 is a flow diagram illustrating an example process 200 that may be performed by a management server, such as management server 2 illustrated in FIGS. 1 and 2. As indicated in the example of FIG. 10, example process 20 includes acts 202, 204, 206, 208, and 210.

Process 20 includes outputting (202), by a server (e.g., management server 2) and for display in a web browser of a trainee computing system (e.g., trainee computing system 20A), a graphical user interface that includes a list of one or more training exercises (e.g., list included in window 70 of FIG. 4A). Each of the one or more training exercises is associated with one or more skills to be demonstrated by a trainee using the trainee computing system during the respective training exercise. Responsive to receiving a request from the trainee computing system to start a training exercise included in the list, process 200 further includes initiating (204), by the server, execution of one or more software agents (e.g., agents 14) that are associated with the one or more skills to be demonstrated by the trainee during the training exercise, and outputting (206), by the server and to the trainee computing system, content corresponding to one or more scenes of an at least partially virtual environment for the training exercise. The content is rendered for display at least in the web browser of the trainee computing system.

Process 200 further includes receiving (208), by the server and from the trainee computing system during the training exercise, interaction data (e.g., interaction data 44) collected by the one or more software agents, where the interaction data is associated with at least one interaction by the trainee with the content corresponding to the one or more scenes, and determining (210), by the server and based on the interaction data, that the one or more skills associated with the training exercise have been demonstrated by the trainee.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processing units (e.g., processors) to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other storage medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processing units (e.g., processors), such as one or more digital signal processors (DSPs), general purpose microprocessors, application specific integrated circuits (ASICs), field programmable logic arrays (FPGAs), or other equivalent integrated or discrete logic circuitry. Accordingly, the term "processing unit" or "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processing units as described above, in conjunction with suitable software and/or firmware.

It is to be recognized that, depending on the embodiment, certain acts or events of any of the methods described herein can be performed in a different sequence, may be added, merged, or left out altogether (e.g., not all described acts or events are necessary for the practice of the method). Moreover, in certain embodiments, acts or events may be performed concurrently, e.g., through multi-threaded processing, interrupt processing, or multiple processing units, rather than sequentially.

In some examples, a computer-readable storage medium comprises a non-transitory medium. The term "non-transitory" indicates that the storage medium is not embodied in a carrier wave or a propagated signal. In certain examples, a non-transitory storage medium may store data that can, over time, change (e.g., in RAM or cache).

Various examples have been described. These and other examples are within the scope of the following claims.

The invention claimed is:

1. A method comprising:
outputting, by a server and for display in a web browser of a trainee computing system, a graphical user interface that includes a list of one or more training exercises, wherein each of the one or more training exercises is associated with one or more skills to be demonstrated by a trainee using the trainee computing system during the respective training exercise;
responsive to receiving a request from the trainee computing system to start a training exercise out of the one or more training exercises included in the list, selecting, by the server out of a plurality of agents and based at least in part on the training exercise, one or more software agents that are associated with the one or more skills associated with the training exercise and initiating, by the server, execution of the one or more software agents, wherein the training exercise is a team-based training exercise associated with the one or more skills to be demonstrated by a plurality of trainees using plurality of trainee computing systems, and wherein team-based training exercise includes a cooperative team-based training exerciser or a competitive team-based training exercise;
outputting, by the server and to the trainee computing system, content corresponding to one or more scenes of an at least partially virtual environment for the team-based training exercise, wherein the content is rendered for display at least in the web browser of the trainee computing system, including outputting, by the server and to the plurality of trainee computing systems taking part in the team-based training exercise, a plurality of content for the team-based training exercise corresponding to scenes of a plurality of at least partially virtual environments, wherein the plurality of content is rendered for display at least in a plurality of web browsers of the plurality of trainee computing systems;
as the plurality of trainees interact with the plurality of content corresponding to the scenes during the team-based training exercise, receiving, by the server and from each of the plurality of trainee computing systems during the team-based training exercise, interaction data collected in real-time by the one or more software agents, wherein the interaction data is associated with one or more interactions by the plurality of trainees with the plurality of content corresponding to the scenes, and wherein the interaction data includes one or more alerts generated by the one or more software agents based at least in part on comparing one or more states associated with the team-based training exercise with one or more thresholds, and wherein the one or more states are a result of actions taken by one or more of the plurality of trainees in interacting with one or more of the plurality of content in one or more of the plurality of at least partially virtual environments that is rendered for display in one or more of the plurality of web browsers of one or more of the trainee computing systems;
outputting, by the server and for display at an evaluator computing system associated with an instructor, a graphical training dashboard, wherein the graphical training dashboard, in a live mode, displays, in real-time, the collected interaction data, the interaction data being associated with the one or more interactions by the plurality of trainees with the plurality of content in the plurality of at least partially virtual environments that is rendered for display in the plurality of web browsers of the plurality of trainee systems, wherein the interaction data includes the one or more alerts, and wherein the graphical training dashboard, in a replay mode, plays back the team-based training exercise after the team-based training exercise and enables pausing playback of the team-based training exercise;
outputting, by the server and to the trainee computing system and based at least in part on the interaction data received from the plurality of trainee computing systems, updated content that is rendered for display at least in the web browser of the trainee computing system; and
determining, by the server and based on the interaction data, that the one or more skills associated with the team-based training exercise have been demonstrated by a team that comprises the trainee.

2. The method of claim 1,
wherein the trainee computing system is communicatively coupled to a head-mounted display worn by the trainee, and
wherein the content is further rendered for display at the head-mounted display.

3. The method of claim 2,
wherein receiving the interaction data collected by the one or more software agents comprises receiving, by the server and from the trainee computing system during the team-based training exercise, data associated with at least one of a position or an orientation of the head-mounted display that is based on at least one interaction by the trainee with the content.

4. The method of claim 1, wherein initiating execution of the one or more software agents comprises initiating, by the server, the execution of the one or more software agents on at least one of the server or the trainee computing system.

5. The method of claim 1, wherein outputting, for display at the evaluator computing system associated with the instructor, the graphical training dashboard further comprises:
outputting, by the server and for display at the evaluator computing system associated with the instructor, graphical training dashboard having one or more skill nodes that represent the one or more skills associated with the team-based training exercise that are to be demonstrated by the team that comprises the trainee; and
responsive to determining that the one or more skills associated with the team-based training exercise have been demonstrated by the team, outputting, by the server and for display at the evaluator computing system, an update to the one or more skill nodes of the graphical training dashboard to graphically indicate that the one or more skills have been demonstrated by the team during the team-based training exercise.

6. The method of claim 5,
wherein the graphical training dashboard graphically indicates a hierarchical relationship between the one or more skill nodes and one or more learning objective nodes that represent one or more learning objectives for the team-based training exercise,
wherein before receiving the interaction data collected by the one or more software agents, the one or more learning objective nodes graphically indicate that the one or more learning objectives have not yet been accomplished by the team, and wherein responsive to determining that the one or more skills associated with the training exercise have been demonstrated by the team, the method further comprises:
- determining, by the server and based on the hierarchical relationship between the one or more skill nodes and the one or more learning objective nodes, that the one or more learning objectives represented by the one or more learning objective nodes have been accomplished by the team during the team-based training exercise; and
- responsive to determining that the one or more learning objectives have been accomplished, outputting, by the server and for display at the evaluator computing system, an update to the one or more learning objective nodes to graphically indicate that the one or more learning objectives have been accomplished by the team during the team-based training exercise.

7. The method of claim 1, further comprising:
- determining, by the server, one or more metrics that are usable to determine whether the one or more skills have been demonstrated by the team during the team-based training exercise; and
- providing, by the server, based on the one or more metrics, one or more metric parameters to configure the one or more software agents to collect the interaction data.

8. The method of claim 1,
- wherein the content comprises one or more of virtual reality content, augmented reality content, or mixed reality content.

9. The method of claim 8, wherein when the content comprises the virtual reality content, outputting the content comprises outputting, by the server and at the trainee computing system, Web Virtual Reality (WebVR) content corresponding to the one or more scenes.

10. The method of claim 8,
- wherein when the content comprises one or more of the augmented reality content or the mixed reality content, the content corresponds to the one or more scenes of the at least partially virtual environment and also of an at least partially real-world environment.

11. A system comprising:
one or more processors; and
a computer-readable storage medium storing instructions that, when executed, cause the one or more processors to:
- output, for display in a web browser of a trainee computing system, a graphical user interface that includes a list of one or more training exercises, wherein each of the one or more training exercises is associated with one or more skills to be demonstrated by a trainee using the trainee computing system during the respective training exercise;
- responsive to receiving a request from the trainee computing system to start a training exercise out of the one or more training exercises included in the list, selecting, out of a plurality of agents and based at least in part on the training exercise, one or more software agents that are associated with the one or more skills associated with the training exercise and initiate execution of the one or more software agents, wherein the training exercise is a team-based training exercise associated with the one or more skills to be demonstrated by a plurality of trainees using plurality of trainee computing systems, and wherein team-based training exercise includes a cooperative team-based training exerciser or a competitive team-based training exercise;
- output, at the trainee computing system, content corresponding to one or more scenes of an at least partially virtual environment for the team-based training exercise, wherein the content is rendered for display at least in the web browser of the trainee computing system, including outputting, at the plurality of trainee computing systems taking part in the team-based training exercise, a plurality of content for the team-based training exercise corresponding to scenes of a plurality of at least partially virtual environments, wherein the plurality of content is rendered for display at least in a plurality of web browsers of the plurality of trainee computing systems;
- as the plurality of trainees interact with the plurality of content corresponding to the scenes during the team-based training exercise, receive, from each of the plurality of trainee computing systems during the team-based training exercise, interaction data collected by the one or more software agents, wherein the interaction data is associated with one or more interactions by the plurality of trainees with the plurality of content corresponding to the scenes, and wherein the interaction data includes one or more alerts generated by the one or more software agents based at least in part on comparing one or more states associated with the team-based training exercise with one or more thresholds, and wherein the one or more states are a result of actions taken by one or more of the plurality of trainees in interacting with one or more of the plurality of content in the plurality of at least partially virtual environments that is rendered for display in one or more of the plurality of web browsers of one or more of the trainee computing systems;
- output, for display at an evaluator computing system associated with an instructor, a graphical training dashboard, wherein the graphical training dashboard, in a live mode, displays, in real-time, the collected interaction data, the interaction data being associated with the one or more interactions by the plurality of trainees with the plurality of content in the plurality of at least partially virtual environments that is rendered for display in the plurality of web browsers of the plurality of trainee systems, wherein the interaction data includes the one or more alerts, and wherein the graphical training dashboard, in a replay mode, plays back the team-based training exercise after the team-based training exercise and enables pausing playback of the team-based training exercise;
- output, at the trainee computing system and based at least in part on the interaction data received from the plurality of trainee computing systems, updated content that is rendered for display at least in the web browser of the trainee computing system; and
- determine, based on the interaction data, that the one or more skills associated with the team-based training exercise have been demonstrated by a team that comprises the trainee.

12. The system of claim 11,
- wherein the trainee computing system is communicatively coupled to a head-mounted display worn by the trainee, and wherein the content is further rendered for display at the head-mounted display.

13. The system of claim 12, wherein the instructions stored on the computer-readable storage medium that cause the one or more processors to receive the interaction data collected by the one or more software agents further cause the one or more processors to receive, from the trainee computing system during the team-based training exercise, data associated with at least one of a position or an orientation of the head-mounted display that is based on at least one interaction by the trainee with the content.

14. The system of claim 11, wherein the instructions stored on the computer-readable storage medium that cause the one or more processors to initiate execution of the one or more software agents further cause the one or more processors to initiate the execution of the one or more software agents on at least one of the system or the trainee computing system.

15. The system of claim 11, wherein the instructions stored on the computer-readable storage medium that cause the one or more processors to output, for display at the evaluator computing system associated with the instructor, the graphical training dashboard further cause the one or more processors to:
   output, for display at the evaluator computing system associated with the instructor, the graphical training dashboard having one or more skill nodes that represent the one or more skills associated with the team-based training exercise that are to be demonstrated by the team that comprises the trainee; and
   responsive to determining that the one or more skills associated with the team-based training exercise have been demonstrated by the team, output, for display at the evaluator computing system, an update to the one or more skill nodes of the graphical training dashboard to graphically indicate that the one or more skills have been demonstrated by the team during the team-based training exercise.

16. The system of claim 11, wherein the instructions stored on the computer-readable storage medium further cause the one or more processors to:
   determine one or more metrics that are usable to determine whether the one or more skills have been demonstrated by the team during the team-based training exercise; and
   provide, based on the one or more metrics, one or more metric parameters to configure the one or more software agents to collect the interaction data.

17. The system of claim 11, wherein the content comprises one or more of virtual reality content, augmented reality content, or mixed reality content.

18. The system of claim 17, wherein when the content comprises one or more of the augmented reality content or the mixed reality content, the content corresponds to the one or more scenes of the at least partially virtual environment and also of an at least partially real-world environment.

19. A non-transitory computer-readable storage medium comprising instructions that, when executed, cause one or more processors of a server to perform operations comprising:
   outputting, for display in a web browser of a trainee computing system, a graphical user interface that includes a list of one or more training exercises, wherein each of the one or more training exercises is associated with one or more skills to be demonstrated by a trainee using the trainee computing system during the respective training exercise;
   responsive to receiving a request from the trainee computing system to start a training exercise out of the one or more training exercises included in the list, selecting, by the server out of a plurality of agents and based at least in part on the training exercise, one or more software agents that are associated with the one or more skills associated with the training exercise and initiating execution of the one or more software agents, wherein the training exercise is a team-based training exercise associated with the one or more skills to be demonstrated by a plurality of trainees using plurality of trainee computing systems, and wherein team-based training exercise includes a cooperative team-based training exerciser or a competitive team-based training exercise;
   outputting, at the trainee computing system, content corresponding to one or more scenes of an at least partially virtual environment for the team-based training exercise, wherein the content is rendered for display at least in the web browser of the trainee computing system, including outputting, at the plurality of trainee computing systems taking part in the team-based training exercise, a plurality of content for the team-based training exercise corresponding to scenes of a plurality of at least partially virtual environments, wherein the plurality of content is rendered for display at least in a plurality of web browsers of the plurality of trainee computing systems;
   as the plurality of trainees interact with the plurality of content corresponding to the scenes during the team-based training exercise, receiving, from each of the plurality of trainee computing systems during the team-based training exercise, interaction data collected by the one or more software agents, wherein the interaction data is associated with one or more interactions by the plurality of trainees with the plurality of content corresponding to the scenes, and wherein the interaction data includes one or more alerts generated by the one or more software agents based at least in part on comparing one or more states associated with the team-based training exercise with one or more thresholds, and wherein the one or more states are a result of actions taken by one or more of the plurality of trainees in interacting with one or more of the plurality of content in one or more of the at least partially virtual environments that is rendered for display in one or more of the plurality of web browsers of one or more of the trainee computing systems;
   outputting, for display at an evaluator computing system associated with an instructor, a graphical training dashboard, wherein the graphical training dashboard, in a live mode, displays, in real-time, the collected interaction data, the interaction data being associated with the one or more interactions by the plurality of trainees with the plurality of content in the plurality of at least partially virtual environments that is rendered for display in the plurality of web browsers of the plurality of trainee systems, wherein the interaction data includes the one or more alerts, and wherein the graphical training dashboard, in a replay mode, plays back the team-based training exercise after the team-based training exercise and enables pausing playback of the team-based training exercise;

outputting, at the trainee computing system and based at least in part on the interaction data received from the plurality of trainee computing systems, updated content that is rendered for display at least in the web browser of the trainee computing system; and determining, based on the interaction data, that the one or more skills associated with the team-based training exercise have been demonstrated by a team that comprises the trainee.

\* \* \* \* \*